US012688508B2

(12) United States Patent
Rule et al.

(10) Patent No.: US 12,688,508 B2
(45) Date of Patent: Jul. 21, 2026

(54) SYSTEMS AND METHODS FOR CONTACTLESS CARD COMMUNICATION AND KEY PAIR CRYPTOGRAPHIC AUTHENTICATION USING DISTRIBUTED STORAGE

(71) Applicant: Capital One Services, LLC, McLean, VA (US)

(72) Inventors: Jeffrey Rule, Chevy Chase, MD (US); Wayne Lutz, Fort Washington, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/352,143

(22) Filed: Jun. 18, 2021

(65) Prior Publication Data

US 2022/0405766 A1 Dec. 22, 2022

(51) Int. Cl.
*G06Q 20/40* (2012.01)
*G06Q 20/34* (2012.01)
(Continued)

(52) U.S. Cl.
CPC ..... *G06Q 20/40975* (2013.01); *G06Q 20/341* (2013.01); *G06Q 20/3829* (2013.01);
(Continued)

(58) Field of Classification Search
CPC ....... H04L 63/06; H04L 9/3263; G06F 21/44; G06F 21/77
See application file for complete search history.

(56) References Cited

U.S. PATENT DOCUMENTS

| 4,683,553 | A | 7/1987 | Mollier |
| 4,827,113 | A | 5/1989 | Rikuna |
(Continued)

FOREIGN PATENT DOCUMENTS

| CA | 3010336 | 7/2017 |
| CA | 3090703 A1 | 9/2019 |
(Continued)

OTHER PUBLICATIONS

FIDO_Everything you need to know about Fast Identity Online (Year: 2021).*
(Continued)

*Primary Examiner* — Ryan D Donlon
*Assistant Examiner* — Amanulla Abdullaev
(74) *Attorney, Agent, or Firm* — KDW Firm PLLC; Andrew D. Kasnevich

(57) ABSTRACT

Systems and methods for authentication may include an authentication server. The authentication server may include a processor and a memory. The processor may be configured to receive an authentication request. The processor may be configured to transmit a notification. The processor may be configured to receive a response that is responsive to the notification, the response comprising a ciphertext and input data. The processor may be configured to generate a Fast Identity Online (FIDO) key pair including a FIDO public key and a FIDO private key. The processor may be configured to encrypt a challenge using the FIDO private key. The processor may be configured to transmit the FIDO public key to decrypt the challenge so as to complete the authentication request.

20 Claims, 7 Drawing Sheets

(51) Int. Cl.
    *G06Q 20/38* (2012.01)
    *H04L 9/40* (2022.01)
(52) U.S. Cl.
    CPC ..... *G06Q 20/388* (2013.01); *G06Q 20/40145*
    (2013.01); *H04L 63/0853* (2013.01); *H04L*
    *63/0876* (2013.01)

(56) References Cited

U.S. PATENT DOCUMENTS

| | | | |
|---|---|---|---|
| 4,910,773 A | 3/1990 | Hazard et al. |
| 5,036,461 A | 7/1991 | Elliott et al. |
| 5,363,448 A | 11/1994 | Koopman, Jr. et al. |
| 5,377,270 A | 12/1994 | Koopman, Jr. et al. |
| 5,533,126 A | 7/1996 | Hazard |
| 5,537,314 A | 7/1996 | Kanter |
| 5,590,038 A | 12/1996 | Pitroda |
| 5,592,553 A | 1/1997 | Guski et al. |
| 5,616,901 A | 4/1997 | Crandall |
| 5,666,415 A | 9/1997 | Kaufman |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,572,015 B1 | 6/2003 | Norton |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,252,242 B2 | 8/2007 | Ho |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,527,208 B2 | 5/2009 | Hammad |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Mamdani et al. |
| 8,005,426 B2 | 8/2011 | Huomo et al. |
| 8,010,405 B1 | 8/2011 | Bortolin et al. |
| RE42,762 E | 9/2011 | Shin |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,276,814 B1 | 10/2012 | Davis |

(56) References Cited

U.S. PATENT DOCUMENTS

| | | | |
|---|---|---|---|
| 8,285,329 B1 | 10/2012 | Zhu | |
| 8,302,872 B2 | 11/2012 | Mullen | |
| 8,312,519 B1 | 11/2012 | Bailey et al. | |
| 8,316,237 B1 | 11/2012 | Felsher et al. | |
| 8,332,272 B2 | 12/2012 | Fisher | |
| 8,346,670 B2 | 1/2013 | Hasson | |
| 8,365,988 B1 | 2/2013 | Medina, III et al. | |
| 8,369,960 B2 | 2/2013 | Tran et al. | |
| 8,371,501 B1 | 2/2013 | Hopkins | |
| 8,381,307 B2 | 2/2013 | Cimino | |
| 8,391,719 B2 | 3/2013 | Alameh et al. | |
| 8,417,231 B2 | 4/2013 | Sanding et al. | |
| 8,433,914 B1 * | 4/2013 | Philpott | H04L 9/3247 |
| | | | 713/180 |
| 8,439,271 B2 | 5/2013 | Smets et al. | |
| 8,475,367 B1 | 7/2013 | Yuen et al. | |
| 8,489,112 B2 | 7/2013 | Roeding et al. | |
| 8,511,542 B2 | 8/2013 | Pan | |
| 8,511,547 B2 | 8/2013 | Rans | |
| 8,519,822 B2 | 8/2013 | Riegebauer | |
| 8,559,872 B2 | 10/2013 | Butler | |
| 8,566,916 B1 | 10/2013 | Vernon et al. | |
| 8,567,670 B2 | 10/2013 | Stanfield et al. | |
| 8,572,386 B2 | 10/2013 | Takekawa et al. | |
| 8,577,810 B1 | 11/2013 | Dalit et al. | |
| 8,583,454 B2 | 11/2013 | Beraja et al. | |
| 8,589,335 B2 | 11/2013 | Smith et al. | |
| 8,594,730 B2 | 11/2013 | Bona et al. | |
| 8,615,468 B2 | 12/2013 | Varadarajan | |
| 8,620,218 B2 | 12/2013 | Awad | |
| 8,667,285 B2 | 3/2014 | Coulier et al. | |
| 8,723,941 B1 | 5/2014 | Shirbabadi et al. | |
| 8,726,405 B1 | 5/2014 | Bailey et al. | |
| 8,740,073 B2 | 6/2014 | Shankar et al. | |
| 8,750,514 B2 | 6/2014 | Gallo et al. | |
| 8,752,189 B2 | 6/2014 | De Jong | |
| 8,794,509 B2 | 8/2014 | Bishop et al. | |
| 8,799,668 B2 | 8/2014 | Cheng | |
| 8,806,592 B2 | 8/2014 | Ganesan | |
| 8,807,440 B1 | 8/2014 | Von Behren et al. | |
| 8,811,892 B2 | 8/2014 | Khan et al. | |
| 8,814,039 B2 | 8/2014 | Bishop et al. | |
| 8,814,052 B2 | 8/2014 | Bona et al. | |
| 8,818,867 B2 | 8/2014 | Baldwin et al. | |
| 8,850,538 B1 | 9/2014 | Vernon et al. | |
| 8,861,733 B2 | 10/2014 | Benteo et al. | |
| 8,870,081 B2 | 10/2014 | Olson | |
| 8,880,027 B1 | 11/2014 | Darringer | |
| 8,888,002 B2 | 11/2014 | Chesney et al. | |
| 8,898,088 B2 | 11/2014 | Springer et al. | |
| 8,934,837 B2 | 1/2015 | Zhu et al. | |
| 8,977,569 B2 | 3/2015 | Rao | |
| 8,994,498 B2 | 3/2015 | Agrafioti et al. | |
| 9,004,365 B2 | 4/2015 | Bona et al. | |
| 9,038,893 B2 | 5/2015 | Kirkham | |
| 9,038,894 B2 | 5/2015 | Khalid | |
| 9,042,814 B2 | 5/2015 | Royston et al. | |
| 9,047,531 B2 | 6/2015 | Showering et al. | |
| 9,069,976 B2 | 6/2015 | Toole et al. | |
| 9,081,948 B2 | 7/2015 | Magne | |
| 9,104,853 B2 | 8/2015 | Venkataramani et al. | |
| 9,118,663 B1 | 8/2015 | Bailey et al. | |
| 9,122,964 B2 | 9/2015 | Krawczewicz | |
| 9,129,199 B2 | 9/2015 | Spodak | |
| 9,129,280 B2 | 9/2015 | Bona et al. | |
| 9,152,832 B2 | 10/2015 | Royston et al. | |
| 9,183,490 B2 | 11/2015 | Moreton | |
| 9,203,800 B2 | 12/2015 | Izu et al. | |
| 9,209,867 B2 | 12/2015 | Royston | |
| 9,251,330 B2 | 2/2016 | Boivie et al. | |
| 9,251,518 B2 | 2/2016 | Levin et al. | |
| 9,258,715 B2 | 2/2016 | Borghei | |
| 9,270,337 B2 | 2/2016 | Zhu et al. | |
| 9,275,325 B2 | 3/2016 | Newcombe | |
| 9,286,606 B2 | 3/2016 | Diamond | |
| 9,306,626 B2 | 4/2016 | Hall et al. | |
| 9,306,753 B1 | 4/2016 | Vandervort | |
| 9,306,942 B1 | 4/2016 | Bailey et al. | |
| 9,324,066 B2 | 4/2016 | Archer et al. | |
| 9,324,067 B2 | 4/2016 | Van Os et al. | |
| 9,332,587 B2 | 5/2016 | Salahshoor | |
| 9,338,622 B2 | 5/2016 | Bjontegard | |
| 9,373,141 B1 | 6/2016 | Shakkarwar | |
| 9,379,841 B2 | 6/2016 | Fine et al. | |
| 9,413,430 B2 | 8/2016 | Royston et al. | |
| 9,413,768 B1 | 8/2016 | Gregg et al. | |
| 9,420,496 B1 | 8/2016 | Indurkar | |
| 9,426,132 B1 | 8/2016 | Alikhani | |
| 9,432,339 B1 | 8/2016 | Bowness | |
| 9,455,968 B1 | 9/2016 | Machani et al. | |
| 9,473,509 B2 | 10/2016 | Arsanjani et al. | |
| 9,491,626 B2 | 11/2016 | Sharma et al. | |
| 9,501,776 B2 | 11/2016 | Martin | |
| 9,553,637 B2 | 1/2017 | Yang et al. | |
| 9,602,508 B1 * | 3/2017 | Mahaffey | H04L 63/10 |
| 9,619,952 B1 | 4/2017 | Zhao et al. | |
| 9,635,000 B1 | 4/2017 | Muftic | |
| 9,665,858 B1 | 5/2017 | Kumar | |
| 9,674,705 B2 | 6/2017 | Rose et al. | |
| 9,679,286 B2 | 6/2017 | Colnot et al. | |
| 9,680,942 B2 | 6/2017 | Dimmick | |
| 9,710,744 B2 | 7/2017 | Wurmfeld | |
| 9,710,804 B2 | 7/2017 | Zhou et al. | |
| 9,740,342 B2 | 8/2017 | Paulsen et al. | |
| 9,740,988 B1 | 8/2017 | Levin et al. | |
| 9,763,097 B2 | 9/2017 | Robinson et al. | |
| 9,767,329 B2 | 9/2017 | Forster | |
| 9,769,662 B1 | 9/2017 | Queru | |
| 9,773,151 B2 | 9/2017 | Mil'shtein et al. | |
| 9,780,953 B2 | 10/2017 | Gaddam et al. | |
| 9,891,823 B2 | 2/2018 | Feng et al. | |
| 9,940,571 B1 | 4/2018 | Herrington | |
| 9,949,065 B1 | 4/2018 | Zarakas | |
| 9,953,323 B2 | 4/2018 | Candelore et al. | |
| 9,961,194 B1 | 5/2018 | Wiechman et al. | |
| 9,965,632 B2 | 5/2018 | Zarakas | |
| 9,965,756 B2 | 5/2018 | Davis et al. | |
| 9,965,911 B2 | 5/2018 | Wishne | |
| 9,977,890 B2 | 5/2018 | Alberti | |
| 9,978,056 B2 | 5/2018 | Seo | |
| 9,978,058 B2 | 5/2018 | Wurmfeld et al. | |
| 9,990,795 B2 | 6/2018 | Wurmfeld | |
| 10,007,873 B2 | 6/2018 | Heo | |
| 10,013,693 B2 | 7/2018 | Wyatt | |
| 10,043,164 B2 | 8/2018 | Dogin et al. | |
| 10,075,437 B1 | 9/2018 | Costigan et al. | |
| 10,121,130 B2 | 11/2018 | Pinski | |
| 10,129,648 B1 | 11/2018 | Hernandez et al. | |
| 10,133,979 B1 | 11/2018 | Eidam et al. | |
| 10,210,505 B2 | 2/2019 | Zarakas | |
| 10,217,105 B1 | 2/2019 | Sangi et al. | |
| 10,242,368 B1 | 3/2019 | Poole | |
| 10,296,910 B1 | 5/2019 | Templeton | |
| 10,332,102 B2 | 6/2019 | Zarakas | |
| 10,360,557 B2 | 7/2019 | Locke | |
| 10,380,471 B2 | 8/2019 | Locke | |
| 10,395,244 B1 | 8/2019 | Mossler | |
| 10,453,054 B2 | 10/2019 | Zarakas | |
| 10,474,941 B2 | 11/2019 | Wurmfeld | |
| 10,475,027 B2 | 11/2019 | Guise | |
| 10,482,453 B2 | 11/2019 | Zarakas | |
| 10,482,457 B2 | 11/2019 | Poole | |
| 10,489,774 B2 | 11/2019 | Zarakas | |
| 10,489,781 B1 | 11/2019 | Osborn | |
| 10,510,070 B2 | 12/2019 | Wurmfeld | |
| 10,515,361 B2 | 12/2019 | Zarakas | |
| 10,535,068 B2 | 1/2020 | Locke | |
| 10,546,444 B2 | 1/2020 | Osborn | |
| 10,581,611 B1 | 3/2020 | Osborn | |
| 10,664,830 B1 | 5/2020 | Rule | |
| 10,685,349 B2 | 6/2020 | Brickell | |
| 10,685,350 B2 | 6/2020 | Osborn et al. | |
| 10,797,882 B2 | 10/2020 | Rule | |
| 10,880,741 B2 | 12/2020 | Zarakas | |

(56) References Cited

U.S. PATENT DOCUMENTS

| | | | |
|---|---|---|---|
| 10,909,525 B1 | 2/2021 | Dhodapkar |
| 10,970,691 B2 | 4/2021 | Koeppel |
| 10,984,416 B2 | 4/2021 | Ilincic |
| 11,037,136 B2 | 6/2021 | Rule |
| 11,062,098 B1 | 7/2021 | Bergeron |
| 11,120,453 B2 | 9/2021 | Rule |
| 11,138,593 B1 | 10/2021 | Ho |
| 11,138,605 B2 | 10/2021 | Aabye |
| 11,176,540 B2 | 11/2021 | Gupta |
| 11,188,908 B2 | 11/2021 | Locke |
| 11,216,806 B2 | 1/2022 | Mossler |
| 11,297,958 B2 | 4/2022 | Vukich |
| 11,334,872 B2 | 5/2022 | Phillips |
| 11,361,173 B2 | 6/2022 | Edwards |
| 11,392,933 B2 | 7/2022 | Mossler |
| 11,392,935 B2 | 7/2022 | Suresh |
| 11,416,844 B1 | 8/2022 | Osterkamp |
| 11,423,392 B1 | 8/2022 | Ho |
| 11,443,292 B2 | 9/2022 | Sherif |
| 11,444,770 B2 | 9/2022 | Wieker |
| 11,461,764 B2 | 10/2022 | Rule |
| 11,481,764 B2 | 10/2022 | Shakkarwar |
| 11,521,213 B2 | 12/2022 | Rule |
| 11,551,200 B1 | 1/2023 | Cook |
| 11,556,918 B2 | 1/2023 | Mestre |
| 11,615,395 B2 | 3/2023 | McHugh |
| 11,777,933 B2 | 10/2023 | Moreton |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2003/0220876 A1 | 11/2003 | Burger |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0228997 A1 | 10/2005 | Bicker |
| 2005/0247797 A1 | 11/2005 | Ramachandran |
| 2005/0269402 A1 | 12/2005 | Spitzer |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0276765 A1 | 11/2007 | Hazel |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0082452 A1 | 4/2008 | Wankmueller |
| 2008/0086767 A1 | 4/2008 | Kulkarni et al. |
| 2008/0099552 A1 | 5/2008 | Grillion |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Amiel et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0262830 A1* | 10/2010 | Kusakawa ............... G06F 21/77 |
| | | 713/172 |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadrajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0155801 A1 | 6/2011 | Rowberry |
| 2011/0208658 A1 | 8/2011 | Makhotin |
| 2011/0208965 A1 | 8/2011 | Machani |
| 2011/0211219 A1 | 9/2011 | Bradley |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |

(56)        References Cited

U.S. PATENT DOCUMENTS

| | | |
|---|---|---|
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143703 A1 | 6/2012 | Wall |
| 2012/0143754 A1 | 6/2012 | Patel |
| 2012/0150737 A1 | 6/2012 | Rottink |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0030997 A1 | 1/2013 | Spodak |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0146657 A1 | 6/2013 | Graef |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0211937 A1 | 8/2013 | Elbirt |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0311363 A1 | 11/2013 | Ramaci |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0081785 A1 | 3/2014 | Valadas Preto |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0189350 A1* | 7/2014 | Baghdasaryan .... H04L 63/0861 |
| | | 713/168 |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365377 A1 | 12/2014 | Salama |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0073983 A1 | 3/2015 | Bartenstein |
| 2015/0088757 A1 | 3/2015 | Zhou et al. |
| 2015/0089586 A1 | 3/2015 | Ballesteros |
| 2015/0113271 A1 | 4/2015 | Jooste |
| 2015/0121068 A1 | 4/2015 | Lindemann et al. |
| 2015/0134452 A1 | 5/2015 | Williams |
| 2015/0134513 A1 | 5/2015 | Olson |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0180869 A1* | 6/2015 | Verma ................. H04L 63/0861 |
| | | 726/4 |
| 2015/0186871 A1 | 7/2015 | Laracey |
| 2015/0199673 A1 | 7/2015 | Savolainen |
| 2015/0199863 A1 | 7/2015 | Scoggins |
| 2015/0205379 A1 | 7/2015 | Mag et al. |
| 2015/0254637 A1 | 9/2015 | Yang |
| 2015/0262180 A1 | 9/2015 | Flambleton et al. |
| 2015/0302409 A1 | 10/2015 | Malek |
| 2015/0317295 A1 | 11/2015 | Sherry |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0348026 A1 | 12/2015 | Roberts et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0078430 A1 | 3/2016 | Douglas |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0189143 A1 | 6/2016 | Koeppel |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |

(56) References Cited

U.S. PATENT DOCUMENTS

| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0026787 A1 | 1/2018 | Le Saint et al. |
| 2018/0034507 A1 | 2/2018 | Wobak et al. |
| 2018/0039986 A1 | 2/2018 | Essebag et al. |
| 2018/0039987 A1 | 2/2018 | Molino |
| 2018/0068316 A1 | 3/2018 | Essebag et al. |
| 2018/0101847 A1* | 4/2018 | Pisut, IV ........... G06Q 20/3227 |
| 2018/0129945 A1 | 5/2018 | Saxena et al. |
| 2018/0160255 A1 | 6/2018 | Park |
| 2018/0167384 A1* | 6/2018 | Raepple .............. H04L 63/0853 |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0337914 A1* | 11/2018 | Mohamad Abdul ...... H04L 9/12 |
| 2018/0359100 A1 | 12/2018 | Gaddam et al. |
| 2018/0365399 A1* | 12/2018 | Deutschmann ....... H04L 63/083 |
| 2019/0014107 A1 | 1/2019 | George |
| 2019/0019375 A1 | 1/2019 | Foley |
| 2019/0036678 A1 | 1/2019 | Ahmed |
| 2019/0075102 A1* | 3/2019 | Kim ..................... H04L 9/3247 |
| 2019/0124081 A1 | 4/2019 | Nowak et al. |
| 2019/0172055 A1 | 6/2019 | Hale |
| 2019/0238517 A1 | 8/2019 | D'Agostino et al. |
| 2019/0303945 A1 | 10/2019 | Mitra |
| 2020/0092284 A1* | 3/2020 | Zhu ..................... H04L 9/3234 |
| 2020/0104841 A1 | 4/2020 | Osborn et al. |
| 2020/0127858 A1 | 4/2020 | Stöhr et al. |
| 2020/0196143 A1* | 6/2020 | Woo ..................... H04W 12/04 |
| 2020/0274866 A1* | 8/2020 | Vilmos ..................... H04L 9/32 |
| 2020/0336308 A1 | 10/2020 | Deutschmann et al. |
| 2020/0396299 A1* | 12/2020 | Mitsov .................. G06F 9/5072 |
| 2021/0004806 A1 | 1/2021 | Noe |
| 2021/0211279 A1* | 7/2021 | Nix ..................... H04L 67/125 |
| 2021/0272098 A1* | 9/2021 | Delsuc ................. G06Q 20/341 |
| 2021/0304189 A1 | 9/2021 | Gupta |
| 2021/0383360 A1 | 12/2021 | Sinha |
| 2021/0406869 A1 | 12/2021 | Pathrabe |
| 2021/0409539 A1* | 12/2021 | Arellano .............. G06F 3/0484 |
| 2022/0114581 A1 | 4/2022 | Upadhye |
| 2022/0166623 A1 | 5/2022 | Alfonso Reyes et al. |
| 2022/0284416 A1 | 9/2022 | Rule |
| 2022/0309509 A1 | 9/2022 | Akgun |
| 2022/0335412 A1 | 10/2022 | Rule |
| 2022/0366410 A1 | 11/2022 | Rule |
| 2022/0398566 A1 | 12/2022 | Rule |
| 2022/0414648 A1 | 12/2022 | Rule |
| 2023/0054157 A1 | 2/2023 | Mao |
| 2023/0065163 A1 | 3/2023 | Vargas |
| 2023/0083785 A1 | 3/2023 | Maiman |
| 2023/0169505 A1 | 6/2023 | Rule |
| 2023/0354020 A1 | 11/2023 | Rule |
| 2023/0359839 A1 | 11/2023 | Lovgren |

FOREIGN PATENT DOCUMENTS

| CN | 101192295 | 6/2008 |
| CN | 102170354 | 8/2011 |
| CN | 102467789 | 5/2012 |
| CN | 103023643 | 4/2013 |
| CN | 103417202 | 12/2013 |
| CN | 104283886 | 1/2015 |
| CN | 104835038 | 8/2015 |
| CN | 106416189 | 2/2017 |
| EP | 1 085 424 | 3/2001 |
| EP | 1 223 565 | 7/2002 |
| EP | 1 265 186 | 12/2002 |
| EP | 1 783 919 | 5/2007 |
| EP | 2 852 070 | 1/2009 |
| EP | 2 139 196 | 12/2009 |
| EP | 1 469 419 | 2/2012 |
| EP | 3 663 946 | 6/2020 |
| GB | 2 457 221 | 8/2009 |
| GB | 2 516 861 | 2/2015 |
| GB | 2 551 907 | 1/2018 |
| JP | 2018198400 A | 12/2018 |
| KR | 101508320 | 4/2015 |
| KR | 20150140132 A | 12/2015 |
| WO | 9910824 A1 | 3/1999 |
| WO | WO 00/49586 | 8/2000 |
| WO | WO 2006070189 | 7/2006 |
| WO | WO 2008055170 | 5/2008 |
| WO | WO 2009025605 | 2/2009 |
| WO | WO 2010049252 | 5/2010 |
| WO | WO 2011112158 | 9/2011 |
| WO | WO 2012001624 | 1/2012 |
| WO | WO 2013039395 | 3/2013 |
| WO | 2013/109932 | 7/2013 |
| WO | WO 2013155562 | 10/2013 |
| WO | WO 2013192358 | 12/2013 |
| WO | WO 2014043278 | 3/2014 |
| WO | WO 2014170741 | 10/2014 |
| WO | WO 2015179649 | 11/2015 |
| WO | WO 2015183818 | 12/2015 |
| WO | WO 2016097718 | 6/2016 |
| WO | WO 2016160816 | 10/2016 |
| WO | WO 2016168394 | 10/2016 |
| WO | 2017047855 A1 | 3/2017 |
| WO | WO 2017042375 | 3/2017 |
| WO | WO 2017042400 | 3/2017 |
| WO | WO 2017157859 | 9/2017 |
| WO | WO 2017208063 | 12/2017 |
| WO | WO 2018063809 | 4/2018 |
| WO | WO 2018137888 | 8/2018 |
| WO | 2019022585 A1 | 1/2019 |
| WO | 2020072575 A1 | 4/2020 |
| WO | 2020/092351 | 5/2020 |
| WO | 2021051884 A1 | 3/2021 |
| WO | 2021133492 A1 | 7/2021 |
| WO | 2022108959 A1 | 5/2022 |
| WO | 2022187350 A1 | 9/2022 |
| WO | 2023017943 A1 | 2/2023 |
| WO | 2023064063 A1 | 4/2023 |

OTHER PUBLICATIONS

Understanding How FIDO Makes Passwordless Authentication Possible (Year: 2021).*

Why Switch to Fast Identity Online (FIDO) Authentication— Identity Management Institute® (Year: 2020).*

Fast Identity Online (FIDO) (Year: 2021).*

FIDO Authentication (Year: 2021).*

(56) References Cited

OTHER PUBLICATIONS

Why switch to FIDO Authentication (Year: 2020).*

Batina, Lejla and Poll, Erik, "SmartCards and RFID," PowerPoint Presentation for IPA Security Course, Digital Security at University of Nijmegen, Netherlands (date unknown), 75 pages.

Haykin M. and Warnar, R., "Smart Card Technology: New Methods for Computer Access Control," Computer Science and Technology NIST Special Publication 500-157:1-60 (1988).

Lehpamer, Harvey, "Component of the RFID System," RFID Design Principles, 2nd edition pp. 133-201 (2012).

Pourghomi, Pardis et al., "A Proposed NFC Payment Application," International Journal of Advanced Computer Science and Applications, vol. 4, No. 8 (2013).

Author Unknown, "CardrefresherSM from American Express®," [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool," [online] 2018-19 [retrieved on Mar. 25, 2019]. Retrieved from Internet URL: https://www.authorize.net/our-features/account-updater/, 5 pages.

Author Unknown, "Visa® Account Updater for Merchants," [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay," Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems," EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifications for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author unknown, "NFC Guide: All You Need to Know About Near Field Communication" Square Guide [online] 2018[retrieved on Nov. 13, 2018]. Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-pay ments/, 6 pages.

Cozma, N., "Copy data from other devices in Android 5.0 Lollipop setup" CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

Kevin, Android Enthusiast, "How to copy text string from nfc tag" StackExchange [online] 2013 [retrieved on Mar. 25, 2019]. Retrieved from the Internet URL: https://android.stackexchange.com/questions/55689/how-to-copy-text-string-from-nfc-tag, 11 pages.

Author unknown, "Tap & Go Device Setup" Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.

Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.

Katz, J., and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Adams, D., and Maier, A-K, "Goldbug Big Seven open source crypto-messengers to be compared - : or Comprehensive Confidentiality Review & Audit of GoldBug Encrypting E-Mail-Client & Secure Instant Messenger", Big Seven Study 2016 [online] [retrieved on Mar. 25, 2019]. Retrieved from Internet URL: https://sf.net/projects/goldbug/files/bigseven-crypto-audit.pdf, 309 pages.

Author Unknown, "Triple DES", Wikipedia [online] 2018 [retrieved on Mar. 25, 2019]. Retrieved from Internet URL: https://simple.wikipedia.org/wiki/Triple_DES, 2 pages.

Song, F., and Yun, A.1, "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Berg, Guy, "Fundamentals of EMV" Smart Card Alliance [online] date unknown [retrieved on Mar. 27, 2019]. Retrieved from Internet URL: https://www.securetechalliance.org/resources/media/scap13_preconference/02.pdf, 37 pages.

Pierce, Kevin, "Is the amazon echo NFC compatible,?" Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.

Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.

Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.

Author unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Menghin, M.J., "Power Optimization Techniques for Near Field Communication Systems" 2014 Dissertation at Technical University of Graz [online]. Retrieved from Internet URL: https://diglib.tugraz.at/download.php?id=576a7b910d2d6&location=browse, 135 pages.

Mareli, M., et al., "Experimental evaluation of NFC reliability between an RFID tag and a smartphone" Conference paper (2013) IEEE AFRICON at Mauritius [online] [retrieved on Mar. 25, 2019]. Retrieved from Internet URL: https://core.ac.uk/download/pdf/54204839.pdf, 5 pages.

Davison, A., et al., "MonoSLAM: Real-Time Single Camera Slam", IEEE Transactions on Pattern Analysis and Machine Intelligence 29(6): 1052-1067 (2007).

Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.

(56) References Cited

OTHER PUBLICATIONS

Author unknown: "onetappayment™", [online] Jan. 24, 2019, [retrieved on Mar. 25, 2019]. Retrieved from Internet URL: https://www.payubiz.in/onetap, 4 pages.

Vu et al., (2012). "Distinguishing users with capacitive touch communication" Proceedings of the Annual International Conference on Mobile Computing and Networking, MOBICOM. 10.1145/2348543.2348569.

EMVCo, EMV Card Personalization Specification, version 1.0 (Jun. 2003), 81 pages.

Ullmann et al., (2012). "On-Card" User Authentication for Contactless Smart Cards based on Gesture Recognition, LNI, 223-234, 12 pages.

Faraj et al. (2008). "Investigation of Java Smart Card Technology for Multi-Task Applications" J. of Al-Anbar University for Pure Science, vol. 2: No. 1: 2008, 11 pages.

Dhamdhere (2017) "Key Benefits of a Unified Platform for Loyalty, Referral Marketing, and UGC" Annex Cloud [retrieved on Jul. 3, 2019]. Retrieved from Internet URL: https://www.annexcloude.com/blog/benefits-unified-platform/, 13 pages.

Brand et al., (2018). "Client to Authentication Protocol (CTAP)", fidoAlliance, [online] Jul. 2, 2018, [retrieved on May 14, 2019]. Retrieved from Internet URL: https://fidoalliance.org/specs/fido-v2.0-rd-20180702/fido-client-to-authenticator-protocol-v2.0-rd-20180702.html, 97 pages.

Lindemann et al., FIDO UAF Protocol Specification Alliance Proposed Standard Feb. 2, 2017, 43 pages) (Year: 2017).

Chang et al., "On Making U2F Protocol Leakage-Resilient via Re-Keying", Cryptology ePrint Archive, Report 2017/721, Aug. 2017, 31 pages (Year: 2017).

HIDglobal (Crescendo C2300 Smart Card Datasheet, Posted Date: Jul. 1, 2019, 2 pages) (Year: 2019).

FIDO2 Deep Dive—Attestations, Trust Model and Security—Kudelski Security Research, Feb. 12, 2020, 22 pages, Retrieved from Internet URL: https://research.kudelskisecurity.com/2020/02/12/fido2-deep-dive-attestations-trust-model-and-security/.

Smart Card Alliance: "Smart Card Technology and the FIDO Protocols", White paper, Apr. 1, 2016, pp. 1-19, XP055540200, Retrieved from the Internet: URL:https://www.securetechalliance.org/wp-content/uploads/FIDO-and-Smart-Card-Technology-FINAL-Apr. 2016.

Fido Alliance: "Client to Authenticator Protocol (CTAP)", Jan. 30, 2019, Retrieved from the Internet: URL:https://fodpa;oamce/prg/specs/fido-v2.0-ps-20190130/fido-client-to-autenticator-protocol-v2.0-ps-20190130.html [retrieved on Sep. 8, 2022].

Roman et al., "KeyLED-transmitting sensitive data over out-of-band channels in wireless sensor netwokrs" (Year: 2018).

Dirk Balfanz "FIDO TechNotes:Channel Binding and FIDO" (Year: 2016).

International Search Report and the Written Opinion of the International Searching Authority issued in related PCT Application No. PCT/US2022/033593 mailed Sep. 20, 2022.

Author Unknown, "Global expansion of card tapping mobile OTP for security and convenience is imminent," Jun. 28, 2022, website: https://www.swidch.com/blogs/card-tapping-motp-blog.

Emvco, "EMV Card Personalisation Specification," Aug. 1, 2021, pp. 1-114, Retrieved from the Internet: URL: https://www.emvco.com/specification/?post_id=12467.

Saush, "Getting information from an EMV chip card with Java," Sep. 8, 2006, WordPress, pp. 1-13.

Smart Card Alliance, "Co-Branded Multi-Application Contactless Cards for Transit and Financial Payment," A Smart Card Alliance Transportation Council White Paper (40 pages), Mar. 2008.

Gomi Hidehito, "Latest Trends in FIDO2," Shell Script Magazine, Japan, USP, Laboratory Co., Ltd., vol. 70, Jan. 25, 2021.

* cited by examiner

400

510 — REDIRECT AUTHENTICATION REQUEST

520 — TRANSMIT PUSH NOTIFICATION

530 — AUTHENTICATE RECEIVED RESPONSE TO PUSH NOTIFICATION

540 — GENERATE A SET OF KEYS

550 — TRANSMIT ONE KEY FOR DECRYPTING A CHALLENGE

500

610 — GENERATE CIPHERTEXT

620 — ENCRYPT CIPHERTEXT

630 — TRANSMIT CIPHERTEXT FOR AUTHENTICATION TO TRIGGER KEY GENERATION

640 — UPDATE COUNTER VALUE

600

SYSTEMS AND METHODS FOR CONTACTLESS CARD COMMUNICATION AND KEY PAIR CRYPTOGRAPHIC AUTHENTICATION USING DISTRIBUTED STORAGE

FIELD OF THE DISCLOSURE

The present disclosure relates to systems and methods for contactless card communication and, more specifically, for key pair cryptographic authentication of contactless cards using distributed storage.

BACKGROUND

Card-based operations often involve the use of a card in communication with a server or other device. It is necessary to protect such communications from interception and unauthorized access. However, there are numerous sophisticated methods for data interception that may be employed by hackers or other fraudulent actors.

For example, transmission of data without encryption or other protection is susceptible to man-in-the-middle attacks, phishing attacks, replay attacks, and other attacks, and may be subject to other vulnerabilities, resulting in increased security risks and increased risks of account or card misuse. These risks may be further increased through the use of contactless cards, which communicate with other devices wirelessly, thus exposing data to potential interception during transmission.

Measures taken to address security risk, such as encryption, may consume system resources and hinder operational efficiency. For large numbers of operations, the consumption of system resources and the hindrance of operation efficiency can increase, which may result in a failure to perform operations or unsatisfactory performance.

These and other deficiencies exist. Accordingly, there is a need for systems and methods for authentication that overcome these deficiencies by protecting communications from interception and unauthorized access in a secure and reliable manner.

SUMMARY OF THE DISCLOSURE

Embodiments of the present disclosure provide an authentication server. The authentication server may include a processor and a memory. The processor may be configured to receive an authentication request. The processor may be configured to transmit a notification. The processor may be configured to receive a response that is responsive to the notification, the response comprising a ciphertext and input data. The processor may be configured to generate a Fast Identity Online (FIDO) key pair including a FIDO public key and a FIDO private key. The processor may be configured to encrypt a challenge using the FIDO private key. The processor may be configured to transmit the FIDO public key to decrypt the challenge so as to complete the authentication request.

Embodiments of the present disclosure provide a method of authentication. The method may include receiving, by a processor, a first request. The method may include transmitting, by the processor, a second request. The method may include receiving, by the processor, a first response that is responsive to the second request, the first response comprising a ciphertext. The method may include generating, by the processor, a Fast Identity Online (FIDO) key pair including a FIDO public key and a FIDO private key. The method may include encrypting, by the processor, a challenge using the FIDO private key. The method may include transmitting, by the processor, the FIDO public key to decrypt the challenge so as to complete the first request.

Embodiments of the present disclosure provide a computer readable non-transitory medium comprising computer executable instructions that, when executed on a processor, perform procedures comprising the steps of: receiving an authentication request; transmitting a notification; receiving a response that is responsive to the notification, the response comprising a ciphertext and input data; generating a Fast Identity Online (FIDO) key pair including a FIDO public key and a FIDO private key; encrypting a challenge using the FIDO private key; and transmitting the FIDO public key to decrypt the challenge so as to complete the authentication request.

BRIEF DESCRIPTION OF THE DRAWINGS

Various embodiments of the present disclosure, together with further objects and advantages, may best be understood by reference to the following description taken in conjunction with the accompanying drawings.

DETAILED DESCRIPTION

Figure 1:
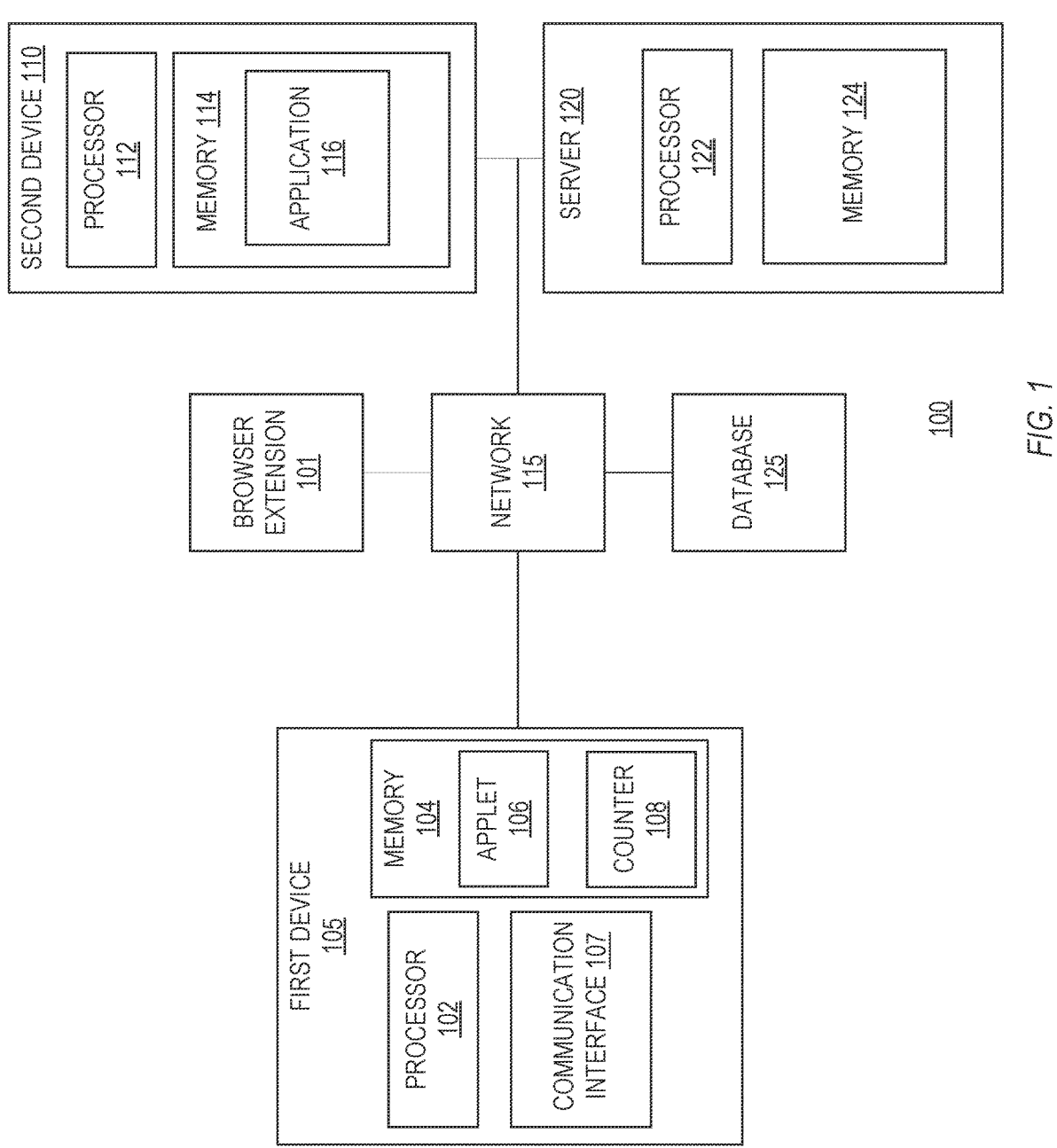
FIG. 1 depicts an authentication system according to an exemplary embodiment.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

The systems and methods disclosed herein may be used to supplement authentication frameworks, including without limitation, Fast Identity Online (FIDO) authentication, Fast Identity Online 2 (FIDO2) authentication, WebAuthn, Client to Authenticator Protocol (CTAP) FIDO, other authentication implementations. Systems and methods employed herein may implement with distributed storage, cloud-based storage, and other forms of storage in support of this functionality. Various authentication processes are implemented, in which a first authentication process may be sent to an application of a device requiring certain response data, and second authentication process may be sent to the application requiring certain input data. Once the response and input data have been authenticated by the cloud-based authenticator, a key pair may be generated in which one of the keys is stored in a secure element, and one of the keys is transmitted to a browser extension to sign a challenge so as to complete an authentication request. Without limitation, the server may comprise the authenticator, including as a cloud-based authenticator and/or as implemented using distributed storage.

Benefits of the systems and methods disclosed herein include improved authentication by protecting communications from interception and unauthorized access. The systems and methods disclosed herein allow for the avoidance of man-in-the-middle attacks and phishing attacks, prevention of replay attacks, and the reduction of other security vulnerabilities.

Further, a concern with the FIDO2 framework and other authentication frameworks is establishing the identity of the user seeking to undertake the authentication process. Systems and methods described herein may reduce this vulnerability by confirming the user attempting to register credentials and authenticate via the framework is the user he or she claims to be and is authorized to perform the authentication process. By doing so, framework security and the ability to exclude unauthorized users may be increased.

In addition, numerous authentication processes may be performed and customized queries may be transmitted via responses to notifications to improve authentication. By doing so, no physical device (e.g., a hardware dongle) is needed to access keys or to retrieve lost, stolen, or misplaced keys when attempting to sign a challenge. Accordingly, security risks may be further mitigated and compatibility across various devices and transaction efficiency may be improved.

These features may be implemented without degrading the user experience by burdening the user with unnecessary security tasks. Further, these features may be performed in a manner that allows for the time-efficient performance of transactions, in order to comply with user expectations and transaction requirements.

Accordingly, the systems and methods disclosed herein reduce the risk of fraudulent activity, such as misuse of the card or an account associated with the card. Systems and methods disclosed herein improve upon implementations that lack secure authentication. These benefits may be advantageously achieved while promoting system efficiency, avoiding degradation of the user experience, and promoting compatibility across numerous devices.

FIG. 1 illustrates an authentication system 100. The system 100 may comprise a browser extension 101, first device 105, a second device 110, a network 115, a server 120, and a database 125. Although FIG. 1 illustrates single instances of components of system 100, system 100 may include any number of components.

System 100 may include a browser extension 101. The browser extension 101 may comprise Chrome®, Internet Explorer®, Firefox®, or Safari®. It is understood that software applications other than a browser extension may be utilized, including stand-alone software applications. Without limitation, an authentication request, such as a website registration or application launch may take place on any device, including but not limited to a laptop or a desktop associated with the browser extension 101. A mobile-based browser 101, or a desktop-based browser 101, may be configured to transmit and receive one or more requests, as further explained below.

System 100 may include a first device 105. Without limitation, the first device 105 may comprise a contactless card, a contact-based card, a network-enabled computer, or other device described herein. As referred to herein, a network-enabled computer may include, but is not limited to a computer device, or communications device including, e.g., a server, a network appliance, a personal computer, a workstation, a phone, a handheld PC, a personal digital assistant, a contactless card, a thin client, a fat client, an Internet browser, a kiosk, a tablet, a terminal, or other device. As further explained below in FIGS. 2A-2B, first device 105 may include one or more processors 102, and memory 104. Memory 104 may include one or more applets 106 and one or more counters 108. Each counter 108 may include a counter value. Memory 104 may include the counter value, transmission data, and at least one key.

First device 105 may include a communication interface 107. The communication interface 107 may comprise communication capabilities with physical interfaces and contactless interfaces. For example, the communication interface 107 may be configured to communicate with a physical interface, such as by swiping through a card swipe interface or inserting into a card chip reader found on an automated teller machine (ATM) or other device configured to communicate over a physical interface. In other examples, the communication interface 107 may be configured to establish contactless communication with a card reading device via a short-range wireless communication method, such as NFC, Bluetooth, Wi-Fi, RFID, and other forms of contactless communication. As shown in FIG. 1, the communication interface 107 may be configured to communicate directly with the second device 110, server 120, and/or database 125 via network 115.

First device 105 may be in data communication with any number of components of system 100. For example, first device 105 may transmit data via network 115 to second device 110, and/or server 120. First device 105 may transmit data via network 115 to database 125. In some examples, first device 105 may be configured to transmit data via network 115 after entry into one or more communication fields of any device. Without limitation, each entry may be associated with a tap, a swipe, a wave, and/or any combination thereof.

System 100 may include a second device 110. The second device 110 may include one or more processors 112, and memory 114. Memory 114 may include one or more applications, including but not limited to application 116. Second device 110 may be in data communication with any number of components of system 100. For example, second device 110 may transmit data via network 115 to server 120. Second device 110 may transmit data via network 115 to database 125. Without limitation, second device 110 may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a contactless card, a thin client, a fat client, an Internet browser, a kiosk, a tablet, a terminal, or other device. Second device 110 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The second device 110 may include processing circuitry and may contain additional components, including processors, memories, error and parity/CRC checkers, data encoders, anticollision algorithms, controllers, command decoders, security primitives and tamperproofing hardware, as necessary to perform the functions described herein. The second device 110 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

System 100 may include a network 115. In some examples, network 115 may be one or more of a wireless network, a wired network or any combination of wireless network and wired network, and may be configured to connect to any one of components of system 100. For example, first device 105 may be configured to connect to server 120 via network 115. In some examples, network 115 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 115 may include, without limitation, telephone lines, fiber optics, IEEE Ethernet 902.3, a wide area network, a wireless personal area network, a LAN, or a global network such as the Internet. In addition, network 115 may support an Internet network, a wireless communication network, a cellular network, or the like, or any combination thereof. Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices. Although network 115 is depicted as a single network, it should be appreciated that according to one or more examples, network 115 may comprise a plurality of interconnected networks, such as, for example, the Internet, a service provider's network, a cable television network, corporate networks, such as credit card association networks, and home networks.

System 100 may include one or more servers 120. In some examples, server 120 may include one or more processors 122 coupled to memory 124. Without limitation, server 120 may comprise a cloud-based authenticator. Server 120 may be configured as a central system, server or platform to control and call various data at different times to execute a plurality of workflow actions. Server 120 may be configured to connect to first device 105. Server 120 may be in data communication with the applet 106 and/or application 116.

For example, a server 120 may be in data communication with applet 106 via one or more networks 115. First device 105 may be in communication with one or more servers 120 via one or more networks 115, and may operate as a respective front-end to back-end pair with server 120. First device 105 may transmit, for example from applet 106 executing thereon, one or more requests to server 120. The one or more requests may be associated with retrieving data from server 120. Server 120 may receive the one or more requests from first device 105. Based on the one or more requests from applet 106, server 120 may be configured to retrieve the requested data. Server 120 may be configured to transmit the received data to applet 106, the received data being responsive to one or more requests.

In some examples, server 120 can be a dedicated server computer, such as bladed servers, or can be personal computers, laptop computers, notebook computers, palm top computers, network computers, mobile devices, wearable devices, or any processor-controlled device capable of supporting the system 100. While FIG. 1 illustrates a single server 120, it is understood that other embodiments can use multiple servers or multiple computer systems as necessary or desired to support the users and can also use back-up or redundant servers to prevent network downtime in the event of a failure of a particular server.

Server 120 may include an application comprising instructions for execution thereon. For example, the application may comprise instructions for execution on the server 120. The application of the server 120 may be in communication with any components of system 100. For example, server 120 may execute one or more applications that enable, for example, network and/or data communications with one or more components of system 100 and transmit and/or receive data. Without limitation, server 120 may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a contactless card, a thin client, a fat client, an Internet browser, or other device. Server 120 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The server 120 may include processing circuitry and may contain additional components, including processors, memories, error and parity/CRC checkers, data encoders, anticollision algorithms, controllers, command decoders, security primitives and tamperproofing hardware, as necessary to perform the functions described herein. The server 120 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

System 100 may include one or more databases 125. The database 125 may comprise a relational database, a non-relational database, or other database implementations, and any combination thereof, including a plurality of relational databases and non-relational databases. In some examples, the database 125 may comprise a desktop database, a mobile database, or an in-memory database. Further, the database 125 may be hosted internally by any component of system 100, such as the first device 105 or server 120, or the database 125 may be hosted externally to any component of the system 100, such as the first device 105 or server 120, by a cloud-based platform, or in any storage device that is in data communication with the first device 105 and server 120. In some examples, database 125 may be in data communication with any number of components of system 100. For example, server 120 may be configured to retrieve the requested data from the database 125 that is transmitted by applet 106. Server 120 may be configured to transmit the received data from database 125 to applet 106 via network 115, the received data being responsive to the transmitted one or more requests. In other examples, applet 106 may be configured to transmit one or more requests for the requested data from database 125 via network 115.

In some examples, exemplary procedures in accordance with the present disclosure described herein can be performed by a processing arrangement and/or a computing arrangement (e.g., computer hardware arrangement). Such processing/computing arrangement can be, for example entirely or a part of, or include, but not limited to, a computer/processor that can include, for example one or more microprocessors, and use instructions stored on a computer-accessible medium (e.g., RAM, ROM, hard drive, or other storage device). For example, a computer-accessible medium can be part of the memory of the first device 105, second device 110, server 120, and/or database 125, or other computer hardware arrangement.

In some examples, a computer-accessible medium (e.g., as described herein above, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein above, for example.

The processor 122 may be configured to receive an authentication request. In some examples, the authentication request may comprise a request for website registration. For example, the authentication request may comprise a request for Fast Identity Online (FIDO) website registration. The processor 122 may be configured to handle a plurality of requests. At least one of the requests may include a FIDO registration request. Moreover, at least one of the requests may include a FIDO authentication request. The plurality of requests may result in a notification, such as a push notification, sent to device 110 to launch an application, such as application 116 or another application comprising instructions for execution. In other examples, the authentication request may comprise a request to launch an application on any device.

The authentication request may be redirected. For example, the authentication request may be redirected from a browser extension 101. In some examples, the browser extension 101 may be configured to intercept FIDO website registration and redirect it to the processor 122 of the cloud-based authenticator server 120. The browser extension 101 may comprise an extension for the Chrome®, Internet Explorer®, Firefox®, and/or Safari® browsers. It is understood that other browser extensions 101 may be utilized, and it is further understood that a stand-alone software application may also be used. Without limitation, the FIDO website registration may take place on any device, including but not limited to a laptop or a desktop. A mobile-based browser 101, or a desktop-based browser 101, may be configured to intercept the FIDO website registration and transmit it to the processor 122 of the server 120. For example, the web site may be configured to issue a challenge via a protocol, including but not limited to Hypertext Transfer Protocol Secure (HTTPS). The browser extension 101 may be configured to redirect this traffic to server 120, such as processor 122, instead of responding to this locally on the device with a FIDO2-enabled device. As further explained below, the processor 122 of server 120 may be configured to redirect the challenge to application 116 of device 110, which is configured to sign the challenge using the processor 102 of first device 105, where the signed challenge is transmitted back to the original device and returned to the website for login. In another example, the application 116 of device 110 may be configured to authenticate a user, as further described below, in which the application 116 of device 110 may transmit received ciphertext to processor 122 of server 120, which would then be configured to verify the user's identity from the received ciphertext, and then the processor 122 of server 120 would then sign the challenge using a FIDO private key generated during the registration process. Such an implementation may be configured to be applicable to website registration and/or application launch. For example, the application may be configured to recognize that the request is being redirected to the processor 122 of server 120. The application 116 of device 110 may be configured to launch when it receives a push notification from processor 122 of server 120, and is configured to receive and transmit the ciphertext from first device 105 to processor 122 of server 120.

The processor 122 may be configured to transmit one or more notifications. In some examples, the processor 122 may be configured to transmit a notification requiring verification of identity. For example, at least one notification may be transmitted from the processor 122 to an application 116 of a device 110, such as second device, that requests identity verification. The one or more notifications may be transmitted to application 116 by the processor 122, and require one or more responses by the application 116. The processor 122 may be configured generate and transmit the one or more notifications. Without limitation, the one or more notifications may comprise a push notification forwarded from the processor 122 to the application 116 of device 110.

The processor 122 may be configured to receive one or more responses that are responsive to the one or more notifications. In some examples, the response may comprise a ciphertext, a cryptogram, or other cryptographic result, and input data. The processor 122 may be configured to receive the one or more responses from the processor 102 of the first device 105, such as a card. For example, the processor 102 of the card may be configured to create the ciphertext using at least one key and a counter value. The ciphertext may include the counter value. The processor 102 of the first device 105 may be configured to transmit the ciphertext via a communication interface 107 to an application 116 of a device 110, which may serve as an intermediary device between the processor 122 and the first device 105 to transmit any data including the ciphertext and input data. For example, the processor 102 of the card may be configured to transmit the ciphertext to the processor 122. The processor 102 of the first device 105 may be configured to update the counter value after transmission of the ciphertext. The ciphertext may be obtained via one or more reads, including but not limited to one or more near field communication data exchange format (NDEF) read. The application 116 of the device 110 may be configured to perform the one or more reads of a tag, such as a near field communication (NFC) tag, of the first device 105. For example, the processor 102 of the card may be configured to transmit, after one or more entries into a communication field of a device, the ciphertext. Without limitation, each entry may be associated with a tap, a swipe, a wave, and/or any combination thereof.

The processor 122 may be configured to transmit a first notification requiring a first response. The first response may comprise the ciphertext. The processor 122 may be configured to receive the first response from the application 116 of device 110. The processor 122 may be configured to verify the ciphertext. After verification of the ciphertext, for example by decrypting the ciphertext that may be encrypted prior to transmission from the application 116 of device 110 to the processor 122 of server 120, the processor 122 may be configured to transmit a second notification to the application 116 that requires a second response. The second response may comprise the input data. The processor 122 may be configured to receive the input data of the second response. The processor 122 may be configured to verify the input data by comparing reference input data to the transmitted input data from the application 116. The reference input data may be stored by the server 120, such as in memory 124. In other examples, the reference input data may be retrieved by the server 120 via, for example, a database 125. For example, the server 120 may be configured to transmit a request to a database 125 to obtain reference input data, and the database 125 may be configured to receive the request and transmit the reference input data in response to the request transmitted by the server 120. In other examples, a single notification may be transmitted by the processor 122 to the application 116 and configured to request both the ciphertext and the input data via a single response, instead of transmitting separate notifications requiring separate responses. Further, the input data may be requested via a first response to a first notification and prior to a second response to a second notification. In other examples, the input data may be requested via a second response to a second notification and after a first response to a first notification.

In some examples, the input data may include biometric data. Without limitation, the biometric data may include at least one selected from the group of a fingerprint, a facial scan, a retina scan, a voice recognition, and/or any combination thereof. In some examples, the input data may additionally and/or alternatively include login data. Without limitation, the login data may include at least one selected from the group of an entry of a user name, a password, an account number, a security code, a one-time passcode, an answer to a security question, and/or any combination thereof. The input data may include at least one selected from the group of biometric data and login data. The input data may include biometric data, login data, and/or any combination thereof.

After identity verification involving both the ciphertext and input data, the processor 122 may be configured to generate a key pair. For example, the processor 122 may be configured to generate a FIDO key pair. The key pair may include a set of keys. In some examples, the FIDO key pair may include a private key and a public key. For example, the FIDO key pair may include a FIDO private key and a FIDO public key. The processor 122 may be configured to store one or more keys. For example, the processor may be configured to store the FIDO private key in a secure element. Rather than storing the FIDO private key in the first device 105, the FIDO private key may be stored in a secure element belonging to the server 120. The FIDO private key may be stored in a secure element maintained by the cloud-based authenticator, such as server 120. The secure element may be hosted in the cloud and may comprise a tamper-resistant secure storage area in which one or more keys may be securely stored and retrieved. In some examples, access to the secure element may be restricted, such as to access only by the processor 122. The processor 122 may be configured to retrieve the FIDO private key from the secure element. In other examples, access to the secure element may be unrestricted, thereby not storing the key for retrieval on a dedicated device. During the initial FIDO registration, the website may be configured to transmit an identifier that uniquely identifies the website and/or the user. When the key, such as the FIDO private key, is generated, the server 120 in the cloud may be configured to store this key in the secure element using the identifier. During subsequent FIDO authentication requests, the website may be configured to transmit the identifier along with the challenge. At the time of signing the challenge, the FIDO private key is then looked up and retrieved from the secure element using the identifier. In this manner, should the key pair be lost or misplaced or stolen, the server 120, such as the cloud-based authenticator, may be configured to generate and transmit the key, such as the FIDO public key without having to need a physical device including the key.

The processor 122 may be configured to encrypt one or more challenges using at least one of the keys from the key pair. For example, the processor 122 may be configured to receive a challenge from the browser extension 101. In some examples, the processor 122 of server 120 may be configured to encrypt a challenge using the FIDO private key. At least one of the keys may be used to decrypt the challenge. For example, the processor 122 may be configured to transmit the FIDO public key to decrypt the challenge so as to complete the authentication request. In some examples, completion of the authentication request may be confirmed by the FIDO public key in which the website confirms the signed challenge and allow access to the website. For example, the challenge may be decrypted with the received FIDO public key by the browser extension 101 to determine if the result matches with the original challenge in order to verify that it was digitally signed. In some examples, the browser extension 101 may be configured to transmit the public key to any device, including but not limited to a separate server or database, to perform decryption of the challenge in order process the authentication request. In this manner, system 100 may implement with distributed storage, cloud-based storage, and other forms of storage in support of the aforementioned functionalities.

Figure 2A:
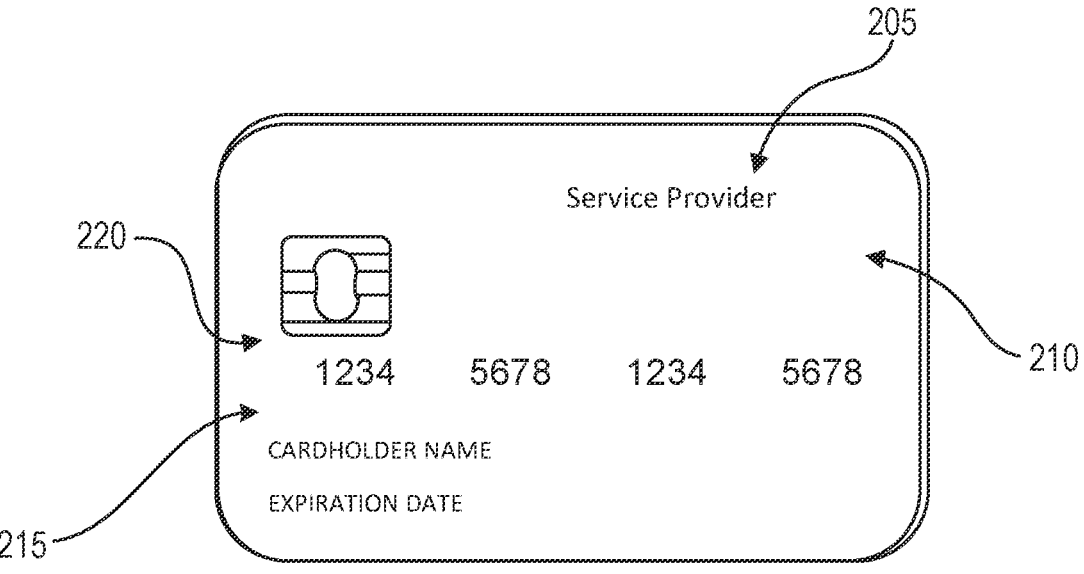
FIG. 2A is an illustration of a first device according to an exemplary embodiment.
Figure 2B:
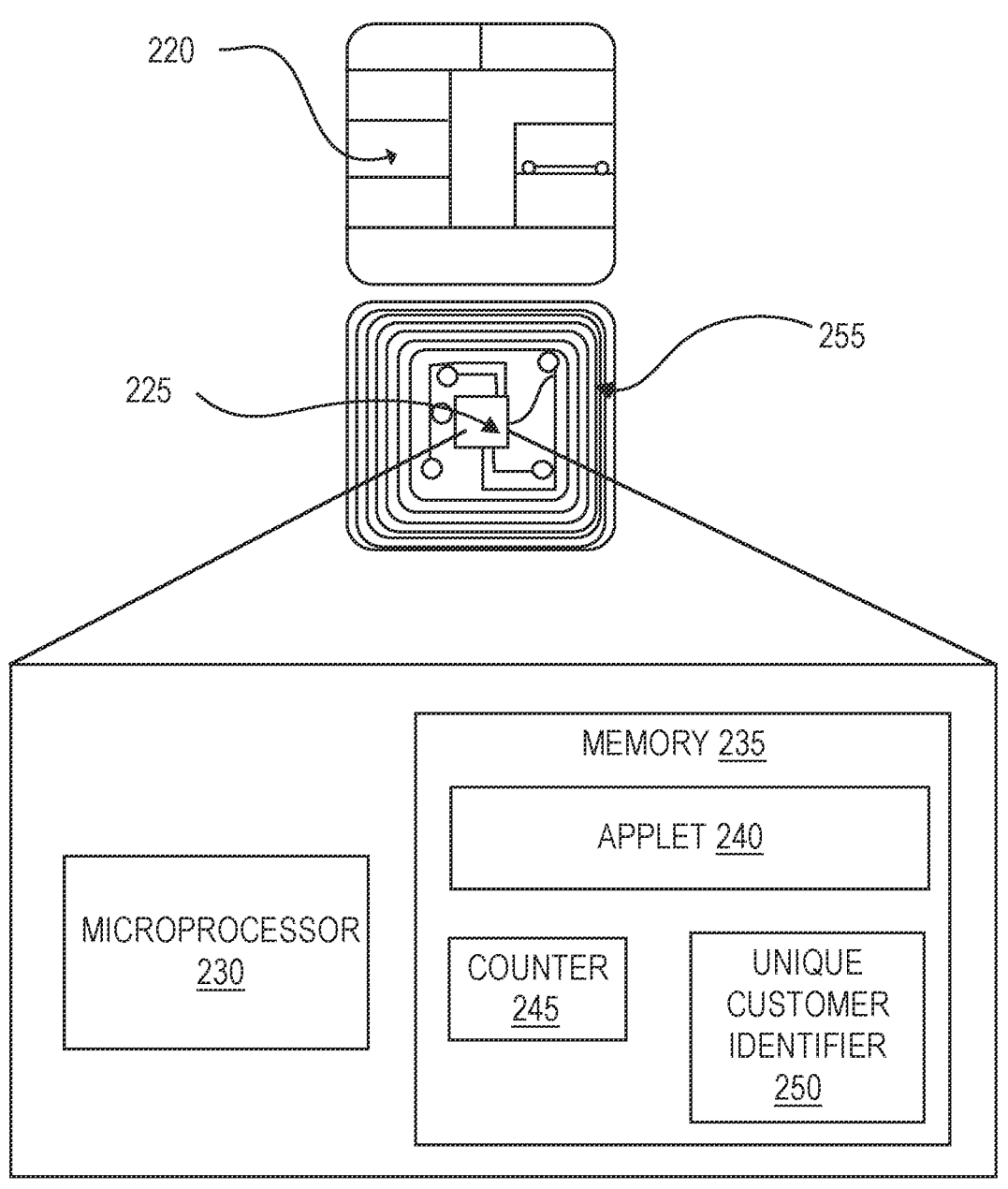
FIG. 2B is an illustration of a contact pad of a first device according to an exemplary embodiment.

FIG. 2A illustrates one or more first devices 200. First device 200 may reference the same or similar components of first device 105, as explained above with respect to FIG. 1. Although FIGS. 2A and 2B illustrate single instances of components of first device 200, any number of components may be utilized.

First device 200 may be configured to communicate with one or more components of system 100. First device 200 may comprise a contact-based card (e.g., a card read by a swipe of a magnetic stripe or by insertion into a chip reader) or a contactless card, and the first device 200 may comprise a payment card, such as a credit card, debit card, or gift card, issued by a service provider 205 displayed on the front or back of the first device 200. In some examples, the first device 200 is not related to a payment card, and may comprise, without limitation, an identification card, a membership card, and a transportation card. In some examples, the payment card may comprise a dual interface contactless payment card.

First device 200 may comprise a substrate 210, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the first device 200 may have physical characteristics compliant with the ID-1 format of the ISO/IEC 7810 standard, and the first device 200 may otherwise be compliant with the ISO/IEC 14443 standard. However, it is understood that the first device 200 according to the present disclosure may have different characteristics, and the present disclosure does not require implementation in a payment card.

The first device 200 may also include identification information 215 displayed on the front and/or back of the card, and a contact pad 220. The contact pad 220 may be configured to establish contact with another communication device, including but not limited to a user device, smartphone, laptop, desktop, or tablet computer. The first device 200 may also include processing circuitry, antenna and other components not shown in FIG. 2A. These components may be located behind the contact pad 220 or elsewhere on the substrate 210. The first device 200 may also include a magnetic strip or tape, which may be located on the back of the card (not shown in FIG. 2A).

As illustrated in FIG. 2B, the contact pad 220 of FIG. 2A may include processing circuitry 225 for storing and processing information, including a processor 230, such as a microprocessor, and a memory 235. It is understood that the processing circuitry 225 may contain additional components, including processors, memories, error and parity/CRC checkers, data encoders, anticollision algorithms, controllers, command decoders, security primitives and tamper-proofing hardware, as necessary to perform the functions described herein.

The memory 235 may be a read-only memory, write-once read-multiple memory or read/write memory, e.g., RAM, ROM, and EEPROM, and the first device 200 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times.

The memory 235 may be configured to store one or more applets 240, one or more counters 245, and a customer identifier 250. The one or more applets 240 may comprise one or more software applications configured to execute on one or more contact-based or contactless cards, such as Java Card applet. However, it is understood that applets 240 are not limited to Java Card applets, and instead may be any software application operable on contact-based or contactless cards or other devices having limited memory. The one or more counters 245 may comprise a numeric counter sufficient to store an integer. The customer identifier 250 may comprise a unique alphanumeric identifier assigned to a user of the first device 200, and the identifier may distinguish the user of the contactless card from other contactless card users. In some examples, the customer identifier 250 may identify both a customer and an account assigned to that customer and may further identify the contactless card associated with the customer's account.

The processor and memory elements of the foregoing exemplary embodiments are described with reference to the contact pad, but the present disclosure is not limited thereto. It is understood that these elements may be implemented outside of the contact pad 220 or entirely separate from it, or as further elements in addition to processor 230 and memory 235 elements located within the contact pad 220.

In some examples, the first device 200 may comprise one or more antennas 255. The one or more antennas 255 may be placed within the first device 200 and around the processing circuitry 225 of the contact pad 220. For example, the one or more antennas 255 may be integral with the processing circuitry 225 and the one or more antennas 255 may be used with an external booster coil. As another example, the one or more antennas 255 may be external to the contact pad 220 and the processing circuitry 225.

In an embodiment, the coil of first device 200 may act as the secondary of an air core transformer. The terminal may communicate with the first device 200 by cutting power or amplitude modulation. The first device 200 may infer the data transmitted from the terminal using the gaps in the first device's power connection, which may be functionally maintained through one or more capacitors. The first device 200 may communicate back by switching a load on the first device's coil or load modulation. Load modulation may be detected in the terminal's coil through interference.

Figure 3:
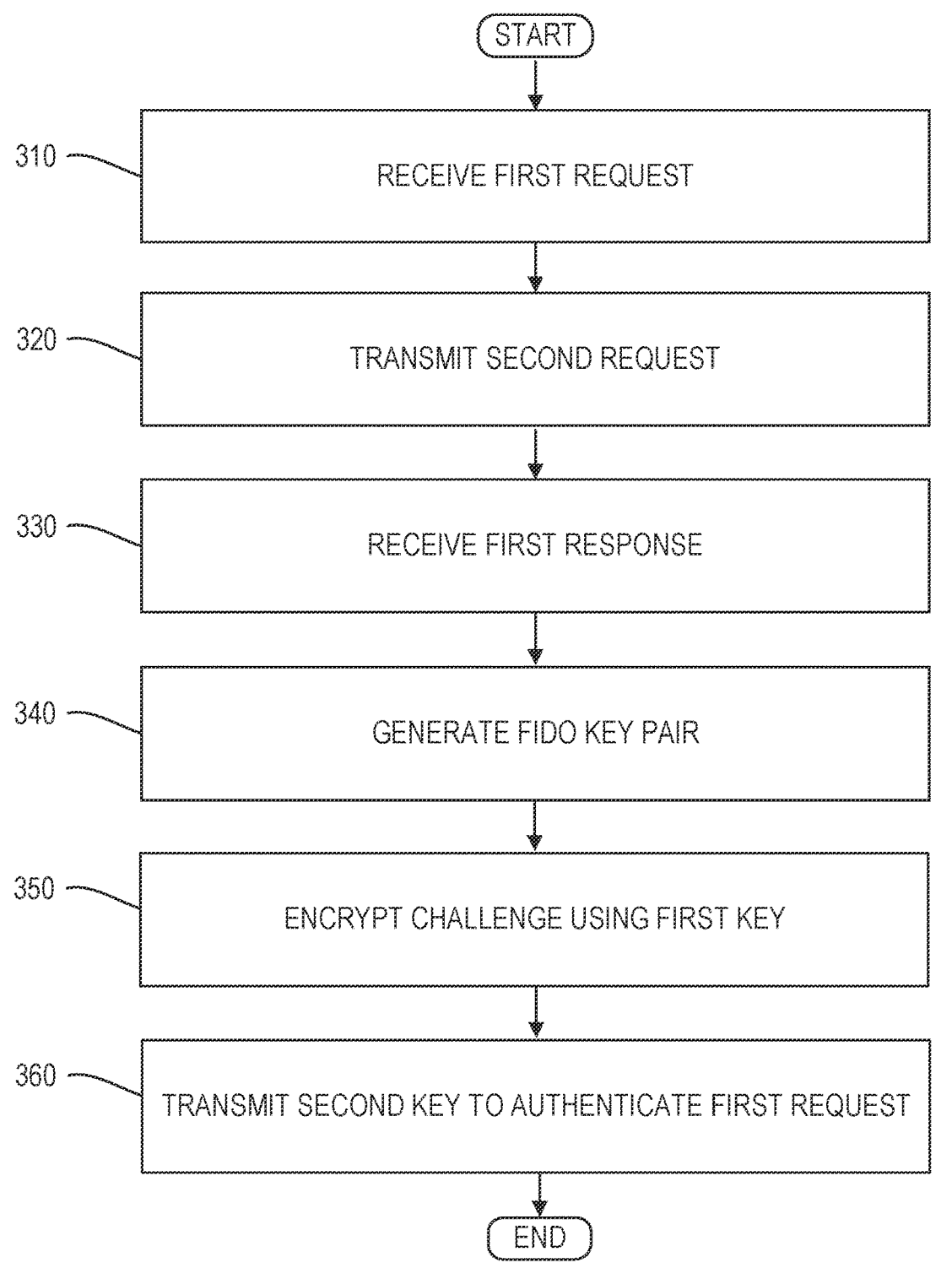
FIG. 3 depicts an authentication method according to an exemplary embodiment.

FIG. 3 depicts a method 300 of authentication, which may include a registration process and/or an application launching process. FIG. 3 may reference the same or similar components of system 100, and first device 200 of FIG. 2A and FIG. 2B.

At block 310, the method 300 may include receiving, by a processor, a first request. For example, the processor may belong to a server. The first request may comprise an authentication request. The processor may be configured to receive the authentication request. In some examples, the authentication request may comprise a request for website registration. For example, the authentication request may comprise a request for FIDO website registration. In other examples, the authentication request may comprise a request to launch an application on any device. In other examples, the authentication request may comprise other actions.

The authentication request may be redirected. For example, the authentication request may be redirected from a browser extension. In some examples, the browser extension may be configured to intercept FIDO website registration and redirect it to the cloud-based authenticator server. The browser extension may comprise an extension for the Chrome®, Internet Explorer®, Firefox®, and/or Safari® browsers. It is understood that other browser extensions may be utilized, and it is further understood that a stand-alone software application may also be used. Without limitation, the FIDO website registration may take place on any device, including but not limited to a mobile device, a tablet, a laptop, or a desktop. A mobile-based browser, a tablet-based browser, a laptop-based browser, or a desktop-based browser, may be configured to intercept the FIDO website registration and transmit it to the server. For example, the website may be configured to issue a challenge via a protocol, including but not limited to Hypertext Transfer Protocol Secure (HTTPS). The browser extension may be configured to redirect this traffic to the server instead of responding directly to the device with a local FIDO2-enabled device. As further explained below, the server may be configured to redirect the challenge to an application of the device, which is configured to sign the challenge using the processor of the first device, where the signed challenge is transmitted back to the original device and returned to the website for login. In another example, the application of the device may be configured to authenticate a user, as further described below, in which the application of the device may transmit received ciphertext to the server, which would verify the user's identity from the received ciphertext. The processor of the server may sign the challenge using a FIDO private key generated during the registration process. Such an implementation may be configured to be applicable to website registration and/or application launch. For example, the application may be configured to recognize that the request is being redirected. The application of the device may be configured to launch when it receives a push notification from the processor of the server, and is configured to receive and transmit the ciphertext from the first device to the server.

At block 320, the method 300 may include transmitting, by the processor, a second request. For example, the second request may comprise a notification. The processor may be configured to transmit one or more notifications. In some examples, the processor may be configured to transmit a notification requiring verification of identity. For example, at least one notification may be transmitted from the processor to an application of a device that requests identity verification. The one or more notifications may be transmitted to the application by the processor, and require one or more responses by the application. The processor may be configured generate and transmit the one or more notifications. Without limitation, the one or more notifications may comprise a push notification forwarded from the processor to the application.

At block 330, the method 300 may include receiving, by the processor, a first response that is responsive to the second request, the first response comprising a ciphertext. For example, the processor may be configured to receive one or more responses that are responsive to the second request including one or more notifications. In some examples, the response may comprise a ciphertext, such as a cryptogram or cryptographic result, and input data. The processor may be configured to receive the one or more responses from the processor of the card. For example, the processor of the card may be configured to create the ciphertext using at least one key and a counter value. The ciphertext may include the counter value. The processor of the card may be configured to transmit the ciphertext via a communication interface to an application of a device, which may serve as an intermediary device between the processor and the card to transmit any data including the ciphertext and input data. For example, the processor of the card may be configured to transmit the ciphertext to the processor. The processor of the card may be configured to update the counter value after transmission of the ciphertext. The ciphertext may be obtained via one or more reads, including but not limited to one or more near field communication data exchange format (NDEF) read. The application of the device may be configured to perform the one or more reads of a tag, such as a near field communication (NFC) tag, of the card. For example, the card may be configured to transmit, after one or more entries into a communication field of a device, the ciphertext. Without limitation, each entry may be associated with a tap, a swipe, a wave, and/or any combination thereof.

The processor may be configured to transmit a first notification requiring a first response. The first response may comprise the ciphertext. The processor may be configured to receive the first response from the application. The processor may be configured to verify the ciphertext. After verification of the ciphertext, for example by decrypting the ciphertext that may be encrypted prior to transmission from the application to the processor, the processor may be configured to transmit a second notification to the application that requires a second response. The second response may comprise the input data. The processor may be configured to receive the input data of the second response. The processor may be configured to verify the input data by comparing reference input data to the transmitted input data from the application. The reference input data may be stored by the server. In other examples, the reference input data may be retrieved by the server via, for example, a database. For example, the server may be configured to transmit a request to a database to obtain reference input data, and the database may be configured to receive the request and transmit the reference input data in response to the request transmitted by the server. In other examples, a single notification may be transmitted by the processor to the application and configured to request both the ciphertext and the input data via a single response, instead of transmitting separate notifications requiring separate responses. Further, the input data may be requested via a first response to a first notification and prior to a second response to a second notification. In other examples, the input data may be requested via a second response to a second notification and after a first response to a first notification.

In some examples, the input data may include biometric data. Without limitation, the biometric data may include at least one selected from the group of a fingerprint, a facial scan, a retina scan, a voice recognition, and/or any combination thereof. In some examples, the input data may additionally and/or alternatively include login data. Without limitation, the login data may include at least one selected from the group of an entry of a user name, a password, an account number, a security code, a one-time passcode, an answer to a security question, and/or any combination thereof. The input data may include at least one selected from the group of biometric data and login data. The input data may include biometric data, login data, and/or any combination thereof.

At block 340, the method 300 may include generating, by the processor, a Fast Identity Online (FIDO) key pair. After identity verification, the processor may be configured to generate the key pair. The key pair may include a set of keys. In some examples, the FIDO key pair may include a private key and a public key. For example, the FIDO key pair may include a FIDO private key and a FIDO public key. The processor may be configured to store one or more keys. For example, the processor may be configured to store the FIDO private key in a secure element. Rather than storing the FIDO private key in the card, the FIDO private key may be stored in a secure element belonging to the server. The FIDO private key may be stored in a secure element maintained by the cloud-based authenticator. The secure element may be hosted in the cloud and may comprise a tamper-resistant secure storage area in which one or more keys may be securely stored and retrieved. In some examples, access to the secure element may be restricted, such as only by the processor. The processor may be configured to retrieve the FIDO private key from the secure element. In other examples, access to the secure element may be unrestricted, thereby not storing the key for retrieval on a dedicated device. During the initial FIDO registration, the website may be configured to transmit an identifier, which uniquely identifies the website and/or the user. When the key, such as the FIDO private key, is generated, the server in the cloud may be configured to store this key in the secure element using the identifier. During subsequent FIDO authentication requests, the website may be configured to transmit the identifier along with the challenge. At the time of signing the challenge, the server may look up and retrieve the FIDO private key from the secure element using the identifier. In this manner, should the key pair be lost or misplaced or stolen, the cloud-based authenticator may be configured to generate and transmit the key, such as the FIDO public key without requiring a physical device that stores the key.

At block 350, the method 300 may include encrypting, by the processor, a challenge using the FIDO private key. For example, the processor may be configured to encrypt one or more challenges using at least one of the keys from the key pair. For example, the processor may be configured to receive a challenge from the browser extension. In some examples, the processor may be configured to encrypt a challenge using the FIDO private key.

At block 360, the method 300 may include transmitting, by the processor, the FIDO public key to decrypt the challenge so as to complete the first request. For example, the processor may be configured to transmit the FIDO public key to decrypt the challenge so as to complete the authentication request. At least one of the keys may be used to decrypt the challenge. In some examples, completion of the authentication request may be confirmed by the FIDO public key in which the website confirms the signed challenge and allow access to the website. For example, the challenge may be decrypted with the received FIDO public key to determine if the result matches with the original challenge in order to verify that it was digitally signed. In this manner, method 300 may implement with distributed storage, cloud-based storage, and other forms of storage in support of the aforementioned functionalities.

Figure 4:
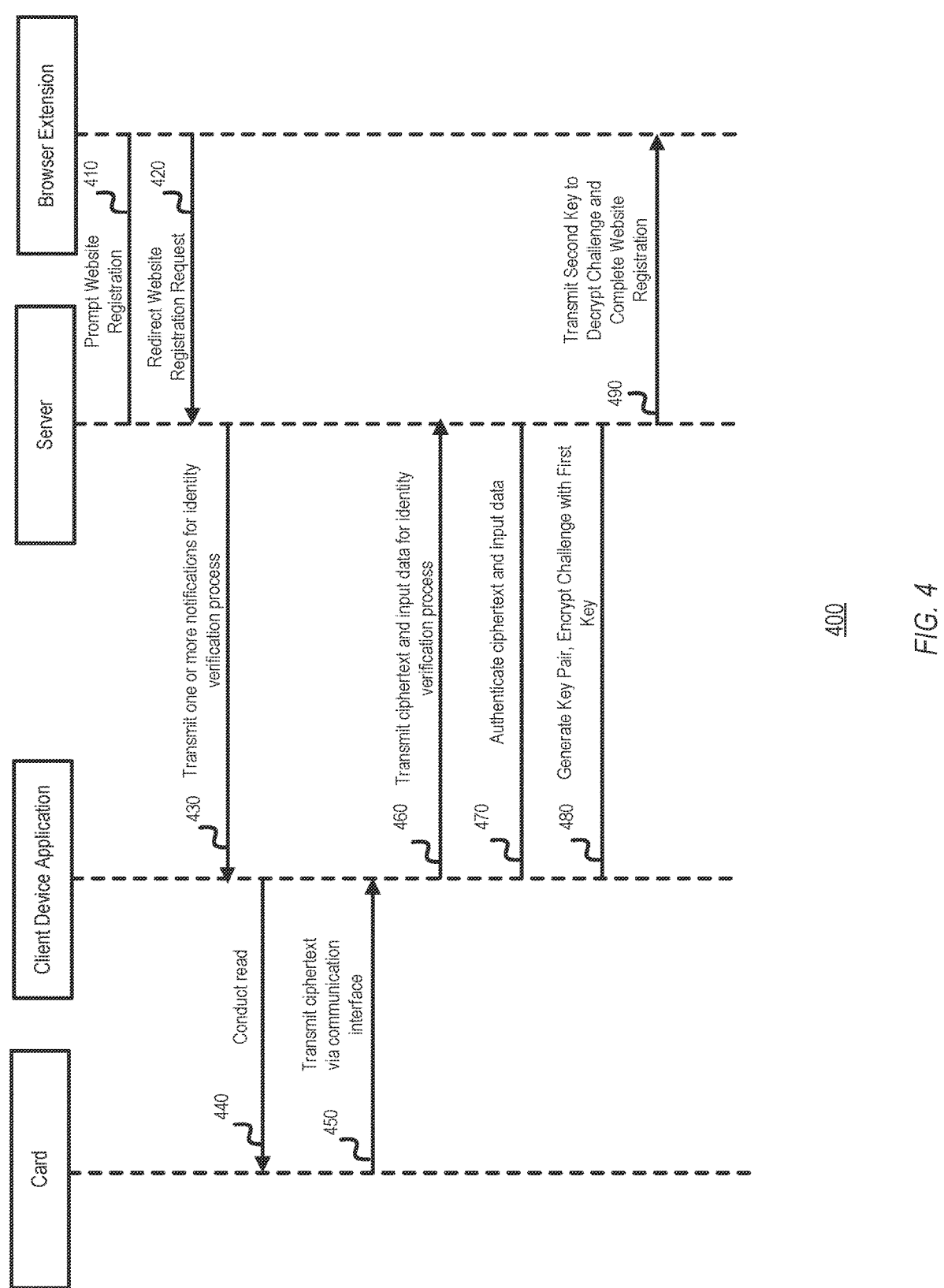
FIG. 4 depicts a sequence diagram of an authentication process according to an exemplary embodiment.

FIG. 4 depicts a sequence diagram 400 of an authentication process according to an exemplary embodiment. The method 400 may include a registration process. FIG. 4 may reference the same or similar components of system 100, first device 200 of FIG. 2A and FIG. 2B, and method 300 of FIG. 3.

At step 410, a user may be prompted by a website to register. For example, a user may be prompted, via a browser extension, for FIDO website registration. Without limitation, the browser extension may comprise Chrome®, Internet Explorer®, Firefox®, or Safari®. It is understood that software applications other than a browser extension, e.g., a standalone software application, may be used. Moreover, the user may be prompted by an application comprising instructions for execution on a device, including but not limited to a laptop, a desktop, or any other device.

At step 420, the browser extension may be configured to intercept the FIDO website registration and redirect this request to an authenticator, such as a cloud-based authenticator. In some examples, a server may comprise the cloud-based authenticator. In some examples, the browser extension may initiate FIDO website registration. Without limitation, the FIDO website registration may take place on any device, including but not limited to a laptop or a desktop. A mobile-based browser, or a desktop-based browser, may be configured to intercept the FIDO website registration and transmit it to the cloud-based authenticator.

In some examples, the request may comprise an authentication request. The cloud-based authenticator may be configured to receive the authentication request. In some examples, the authentication request may comprise a request for website registration. For example, the authentication request may comprise a request for Fast Identity Online (FIDO) website registration. In other examples, the authentication request may comprise a request to launch an application on any device.

The authentication request may be redirected. For example, the authentication request may be redirected from the browser extension. In some examples, the browser extension may be configured to intercept FIDO website registration and redirect it to the cloud-based authenticator server. For example, the website may be configured to issue a challenge via a protocol, including but not limited to Hypertext Transfer Protocol Secure (HTTPS). The browser extension may be configured to redirect this traffic to the cloud-based authenticator server instead of responding directly to the device with a local FIDO2-enabled device. As further explained below, the cloud-based authenticator server may be configured to redirect the challenge to the application of the device, which is configured to sign the challenge using the processor of the first device, where the signed challenge is transmitted back to the original device and returned to the website for login. In another example, the application of the device may be configured to authenticate a user, as further described below, in which the application of the device may transmit received ciphertext to processor of cloud-based authenticator server, which may verify the user's identity from the received ciphertext. The processor of the cloud-based authenticator server may sign the challenge using a FIDO private key generated during the registration process. Such an implementation may be configured to be applicable to website registration and/or application launch. For example, the application may be configured to recognize that the request is being redirected. The application of the device may be configured to launch when it receives a push notification from the processor of the cloud-based authenticator server, and is configured to receive and transmit the ciphertext from the first device to the cloud-based authenticator server.

At step 430, the cloud-based authenticator may be configured to perform an identity verification process. For example, the cloud-based authenticator may perform the identity verification process by generating and transmitting one or more notifications to an application comprising instructions for execution on device. For example, the cloud-based authenticator may be configured to transmit one or more notifications. In some examples, the cloud-based authenticator may be configured to transmit a notification requiring verification of identity. For example, at least one notification may be transmitted from the cloud-based authenticator to the application. The one or more notifications may be transmitted to the application by the cloud-based authenticator, and require one or more responses by the application. The cloud-based authenticator may be configured generate and transmit the one or more notifications. Without limitation, the one or more notifications may comprise a push notification forwarded from the cloud-based authenticator to the application.

At step 440, the application of the device may be configured to receive the one or more notifications transmitted by the cloud-based authenticator. Responsive to the one or more notifications, the application of the device may be configured to conduct one or more reads of the card. The ciphertext may be obtained via one or more reads, including but not limited to one or more near field communication data exchange format (NDEF) read. The application of the device may be configured to perform the one or more reads of a tag, such as a near field communication (NFC) tag, of the card. For example, the card may be configured to transmit, after one or more entries into a communication field of a device, the ciphertext. Without limitation, each entry may be associated with a tap, a swipe, a wave, and/or any combination thereof. For example, the processor of the card may be configured to create the ciphertext using at least one key and a counter value. The ciphertext may include the counter value.

At step 450, the processor of the card may be configured to transmit the ciphertext via a communication interface to the application of the device, which may serve as an intermediary device between the cloud-based authenticator and the card to transmit any data including the ciphertext and input data. For example, the processor of the card may be configured to transmit the ciphertext to the cloud-based authenticator. The processor of the card may be configured to update the counter value after transmission of the ciphertext.

At step 460, the application of the device may be configured to transmit one or more responses that are responsive to the one or more notifications transmitted by the cloud-based authenticator. In response to the one or more notifications, the application of the device may prompt for entry of a card into a communication field of the device. For example, the application of the device may transmit a first response that is responsive to one or more notifications from the cloud-based authenticator, the first response comprising a ciphertext. In some examples, the response may comprise a ciphertext, such as a cryptogram or cryptographic result, and input data. For example, the processor of the card may be configured to create the ciphertext using at least one key and a counter value. The ciphertext may include the counter value. The processor of the card may be configured to transmit the ciphertext via a communication interface to the application of the device, which may serve as an intermediary device between the cloud-based authenticator and the card to transmit any data including the ciphertext and input data. For example, the processor of the card may be configured to transmit the ciphertext to the cloud-based authenticator.

In some examples, the input data may include biometric data. Without limitation, the biometric data may include at least one selected from the group of a fingerprint, a facial scan, a retina scan, a voice recognition, and/or any combination thereof. In some examples, the input data may additionally and/or alternatively include login data. Without limitation, the login data may include at least one selected from the group of an entry of a user name, a password, an account number, a security code, a one-time passcode, an answer to a security question, and/or any combination thereof. The input data may include at least one selected from the group of biometric data and login data. The input data may include biometric data, login data, and/or any combination thereof. In this manner, identity verification may be complete after authentication of both the ciphertext and input data.

At step 470, the cloud-based authenticator may be configured to receive the one or more responses transmitted by the application of the device. In some examples, the cloud-based authenticator may be configured to receive the one or more responses from the card. The cloud-based authenticator may be configured to validate, via the identity verification process, the one or more responses received. The cloud-based authenticator may be configured to receive and authenticate the first response from the application. The cloud-based authenticator may be configured to verify the ciphertext. After verification of the ciphertext, for example by decrypting the ciphertext that may be encrypted prior to transmission from the application to the cloud-based authenticator, the cloud-based authenticator may be configured to transmit a second notification to the application that requires a second response. The second response may comprise the input data. The cloud-based authenticator may be configured to receive the input data of the second response. The cloud-based authenticator may be configured to verify the input data by comparing reference input data to the transmitted input data from the application. The reference input data may be stored by the cloud-based authenticator. In other examples, the reference input data may be retrieved by the cloud-based authenticator via, for example, a database. For example, the cloud-based authenticator may be configured to transmit a request to a database to obtain reference input data, and the database may be configured to receive the request and transmit the reference input data in response to the request transmitted by the cloud-based authenticator. In other examples, a single notification may be transmitted by the cloud-based authenticator to the application and configured to request both the ciphertext and the input data via a single response, instead of transmitting separate notifications requiring separate responses. Further, the input data may be requested via a first response to a first notification and prior to a second response to a second notification. In other examples, the input data may be requested via a second response to a second notification and after a first response to a first notification.

At step 480, the cloud-based authenticator may be configured to generate a key pair that is unique to the user. For example, after identity verification, the cloud-based authenticator may be configured to generate the key pair. The key pair, such as a FIDO key pair, may include a set of keys. In some examples, the FIDO key pair may include a private key and a public key. For example, the FIDO key pair may include a FIDO private key and a FIDO public key. The cloud-based authenticator may be configured to store one or more keys. For example, the cloud-based authenticator may be configured to store the FIDO private key in a secure element. Rather than storing the FIDO private key in the card, the FIDO private key may be stored in a secure element belonging to the cloud-based authenticator. The FIDO private key may be stored in a secure element maintained by the cloud-based authenticator. The secure element may be hosted in the cloud and may comprise a tamper-resistant secure storage area in which one or more keys may be securely stored and retrieved. In some examples, access to the secure element may be restricted, such as only by the cloud-based authenticator. The cloud-based authenticator may be configured to retrieve the FIDO private key from the secure element. In other examples, access to the secure element may be unrestricted, thereby not storing the key for retrieval on a dedicated device. During the initial FIDO registration, the website may be configured to transmit an identifier, which uniquely identifies the website and/or the user. When the key, such as the FIDO private key is generated, the cloud-based authenticator in the cloud may be configured to store this key in the secure element using the identifier. During subsequent FIDO authentication requests, the website may be configured to transmit the identifier along with the challenge. At the time of signing the challenge, the server may look up and retrieve the FIDO private key from the secure element using the identifier. In this manner, should the key pair be lost or misplaced or stolen, the cloud-based authenticator may be configured to generate and transmit the key, such as the FIDO public key without requiring a physical device that stores the key.

The cloud-based authenticator may be configured to transmit one of the keys to the browser extension. For example, the cloud-based authenticator may be configured to transmit the FIDO private key which may be used to encrypt a challenge. In some examples, the cloud-based authenticator may be configured to encrypt one or more challenges using at least one of the keys from the key pair. For example, the cloud-based authenticator may be configured to receive a challenge from the browser extension. In some examples, the cloud-based authenticator may be configured to encrypt a challenge using the FIDO private key.

At step 490, the browser extension may be configured to receive one of the keys transmitted by the cloud-based authenticator. For example, the browser extension may be configured to receive and transmit the FIDO public key, such as a database, to decrypt the challenge so as to complete the authentication request. In some examples, completion of the authentication request may be confirmed by the FIDO public key in which the website confirms the signed challenge and allow access to the website. For example, the challenge may be decrypted with the received FIDO public key from the cloud-based authenticator to determine if the result matches with the original challenge in order to verify that it was digitally signed. In this manner, sequence diagram 400 of authentication process may implement with distributed storage, cloud-based storage, and other forms of storage in support of the aforementioned functionalities.

Figure 5:
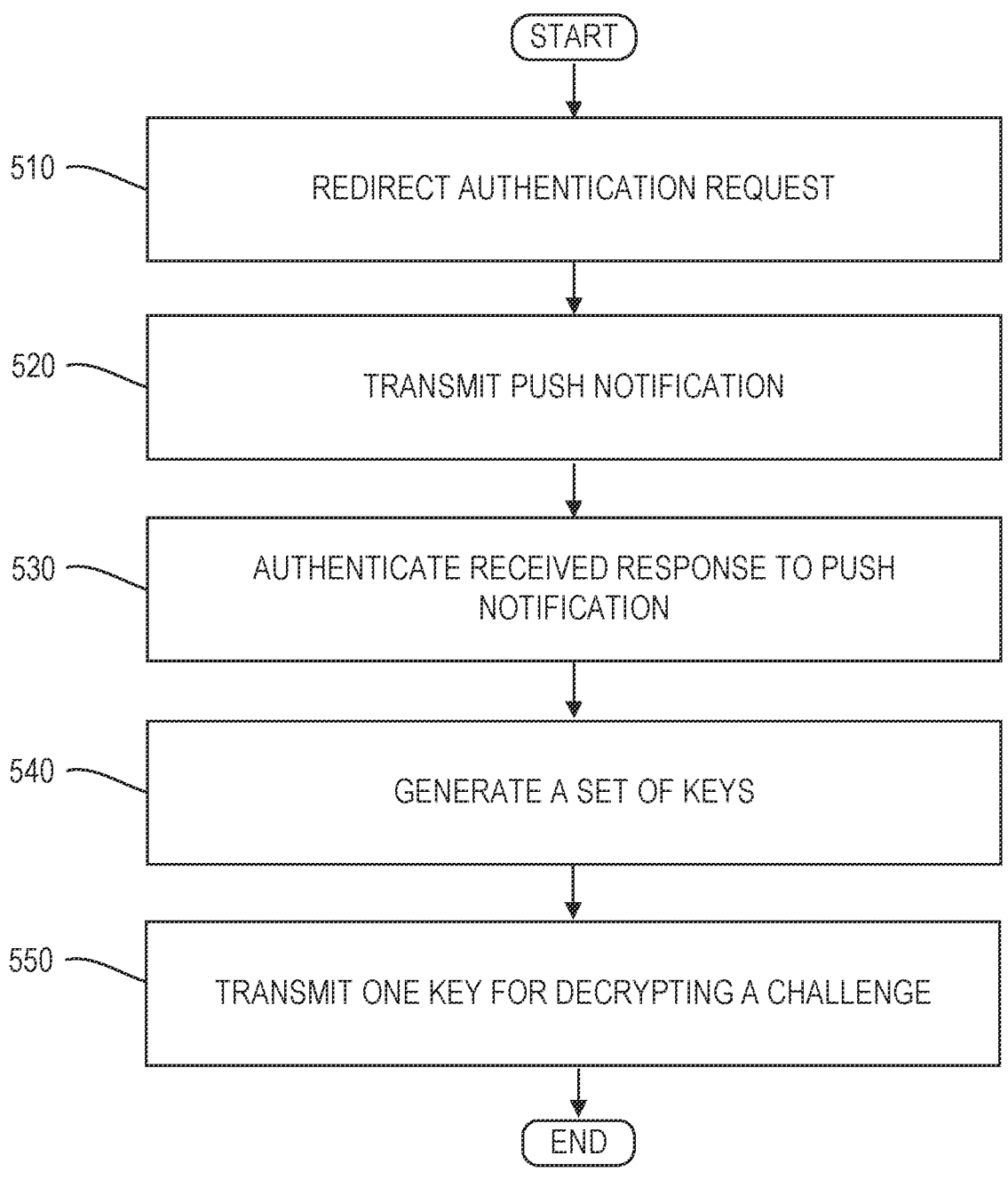
FIG. 5 depicts an authentication method according to an exemplary embodiment.

FIG. 5 depicts a method of 500 of authentication according to an exemplary embodiment. The method 500 may include a registration process. FIG. 5 may reference the same or similar components of system 100, first device 200 of FIG. 2A and FIG. 2B, method 300 of FIG. 3, and sequence diagram 400 of FIG. 4.

At block 510, the method 500 may include redirecting a request. For example, the request may comprise an authentication request. A processor of a server may be configured to receive the authentication request. In some examples, the authentication request may comprise a request for website registration. For example, the authentication request may comprise a request for Fast Identity Online (FIDO) website registration. In other examples, the authentication request may comprise a request to launch an application on any device.

The authentication request may be redirected. For example, the authentication request may be redirected from a browser extension. In some examples, the browser extension may be configured to intercept FIDO website registration and redirect it to the cloud-based authenticator server. The browser extension 101 may comprise an extension for the Chrome®, Internet Explorer Firefox®, and/or Safari® browsers. It is understood that other browser extensions 101 may be utilized, and it is further understood that a standalone software application may also be used. Without limitation, the FIDO website registration may take place on any device, including but not limited to a laptop or a desktop. A mobile-based browser, or a desktop-based browser, may be configured to intercept the FIDO website registration and transmit it to the server. For example, the website may be configured to issue a challenge via a protocol, including but not limited to Hypertext Transfer Protocol Secure (HTTPS). The browser extension may be configured to redirect this traffic to the server instead of responding directly to the device with a local FIDO2-enabled device. As further explained below, the server may be configured to redirect the challenge to an application of the device, which is configured to sign the challenge using the processor of the first device, where the signed challenge is transmitted back to the original device and returned to the website for login. In another example, the application of the device may be configured to authenticate a user, as further described below, in which the application of the device may transmit received ciphertext to the server, which may verify the user's identity from the received ciphertext. The server may then sign the challenge using a FIDO private key generated during the registration process. Such an implementation may be configured to be applicable to website registration and/or application launch. For example, the application may be configured to recognize that the request is being redirected. The application of the device may be configured to launch when it receives a push notification from the processor of the server, and is configured to receive and transmit the ciphertext from the first device to the server.

At block 520, the method 500 may include transmitting a push notification. For example, the push notification may be transmitted by the processor. In some examples, the processor may be configured to perform identity verification by transmitting a notification. For example, at least one notification may be transmitted from the processor to an application of a device that requests identity verification. The one or more notifications may be transmitted to the application by the processor, and require one or more responses by the application. The processor may be configured generate and transmit the one or more notifications. Without limitation, the one or more notifications may comprise a push notification forwarded from the processor to the application.

At block 530, the method 500 may include authenticating a response. For example, the processor may be configured to authenticate one or more responses that are transmitted by the application of the device and responsive to the push notification. In some examples, a response may comprise a ciphertext, such as a cryptogram or cryptographic result, and input data. The processor may be configured to receive the one or more responses from a processor of the card. For example, the processor of the card may be configured to create the ciphertext using at least one key and a counter value. The ciphertext may include the counter value. The processor of the card may be configured to transmit the ciphertext via a communication interface to an application of a device, which may serve as an intermediary device between the processor and the card to transmit any data including the ciphertext and input data. For example, the processor of the card may be configured to transmit the ciphertext to the processor. The processor of the card may be configured to update the counter value after transmission of the ciphertext. The ciphertext may be obtained via one or more reads, including but not limited to one or more near field communication data exchange format (NDEF) read. The application of the device may be configured to perform the one or more reads of a tag, such as a near field communication (NFC) tag, of the card. For example, the card may be configured to transmit, after one or more entries into a communication field of a device, the ciphertext. Without limitation, each entry may be associated with a tap, a swipe, a wave, and/or any combination thereof.

The processor may be configured to transmit a first notification requiring a first response. The first response may comprise the ciphertext. The processor may be configured to receive the first response from the application. The processor may be configured to verify the ciphertext. After verification of the ciphertext, for example by decrypting the ciphertext that may be encrypted prior to transmission from the application to the processor, the processor may be configured to transmit a second notification to the application that requires a second response. The second response may comprise the input data. The processor may be configured to receive the input data of the second response. The processor may be configured to verify the input data by comparing reference input data to the transmitted input data from the application. The reference input data may be stored by the server. In other examples, the reference input data may be retrieved by the server via, for example, a database. For example, the server may be configured to transmit a request to a database to obtain reference input data, and the database may be configured to receive the request and transmit the reference input data in response to the request transmitted by the server. In other examples, a single notification may be transmitted by the processor to the application and configured to request both the ciphertext and the input data via a single response, instead of transmitting separate notifications requiring separate responses. Further, the input data may be requested via a first response to a first notification and prior to a second response to a second notification. In other examples, the input data may be requested via a second response to a second notification and after a first response to a first notification.

In some examples, the input data may include biometric data. Without limitation, the biometric data may include at least one selected from the group of a fingerprint, a facial scan, a retina scan, a voice recognition, and/or any combination thereof. In some examples, the input data may additionally and/or alternatively include login data. Without limitation, the login data may include at least one selected from the group of an entry of a user name, a password, an account number, a security code, a one-time passcode, an answer to a security question, and/or any combination thereof. The input data may include at least one selected from the group of biometric data and login data. The input data may include biometric data, login data, and/or any combination thereof.

At block 540, the method 500 may include generating a key pair. For example, the processor may be configured to generate FIDO key pair. After identity verification, the processor may be configured to generate the key pair. The key pair may include a set of keys. In some examples, the FIDO key pair may include a private key and a public key. For example, the FIDO key pair may include a FIDO private key and a FIDO public key. The processor may be configured to store one or more keys. For example, the processor may be configured to store the FIDO private key in a secure element. Rather than storing the FIDO private key in the card, the FIDO private key may be stored in a secure element belonging to the server. The FIDO private key may be stored in a secure element maintained by the processor of the server. The secure element may be hosted in the cloud and may comprise a tamper-resistant secure storage area in which one or more keys may be securely stored and retrieved. In some examples, access to the secure element may be restricted, such as only by the processor. The processor may be configured to retrieve the FIDO private key from the secure element. In other examples, access to the secure element may be unrestricted, thereby not storing the key for retrieval on a dedicated device. During the initial FIDO registration, the website may be configured to transmit an identifier which uniquely identifies the web site and/or the user. When the key, such as the FIDO private key is generated, the server in the cloud may be configured to store this key in the secure element using the identifier. During subsequent FIDO authentication requests, the web site may be configured to transmit the identifier along with the challenge. At the time of signing the challenge, the FIDO private key is then looked up and retrieved from the secure element using the identifier. In this manner, should the key pair be lost or misplaced or stolen, the cloud-based authenticator may be configured to generate and transmit the key, such as the FIDO public key without having to need a physical device including the key.

At block 550, the method 500 may include transmitting a key for decryption. For example, one of the keys, such as the FIDO private key, may be configured to encrypt a challenge by the processor, which may also be configured to transmit the FIDO public key for decrypting a challenge. For example, the processor may be configured to transmit the FIDO public key to decrypt the challenge so as to complete the authentication request. At least one of the keys may be used to decrypt the challenge. In some examples, completion of the authentication request may be confirmed by the FIDO public key in which the website confirms the signed challenge and allow access to the website. For example, the challenge may be decrypted with the received FIDO public key to determine if the result matches with the original challenge in order to verify that it was digitally signed. In this manner, method 500 may implement with distributed storage, cloud-based storage, and other forms of storage in support of the aforementioned functionalities.

Figure 6:
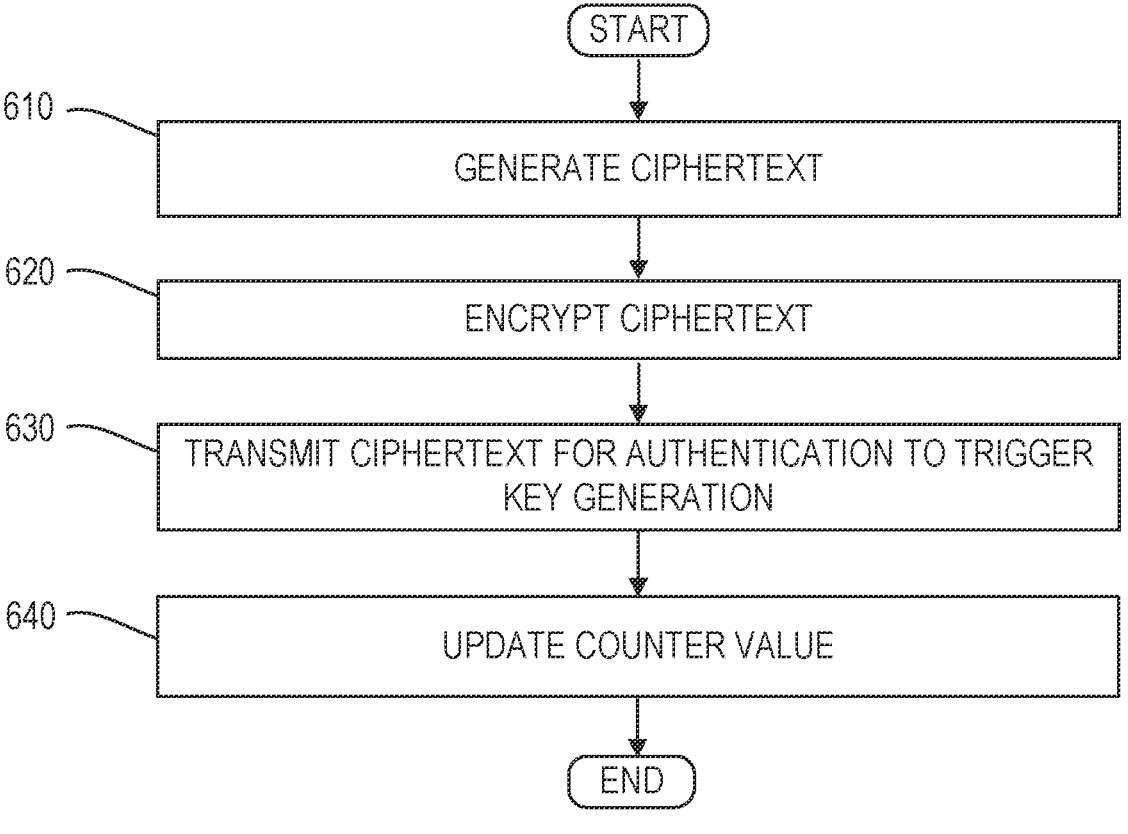
FIG. 6 depicts an authentication method according to an exemplary embodiment.

FIG. 6 depicts an authentication method 600 according to an exemplary embodiment. The method 600 may include a registration process. FIG. 6 may reference the same or similar components of system 100, first device 200 of FIG. 2A and FIG. 2B, method 300 of FIG. 3, sequence diagram 400 of FIG. 4, and method 500 of FIG. 5.

At block 610, the method 600 may include generating a ciphertext. For example, a processor of a card may be configured to generate a ciphertext. In some examples, the processor of the card may be configured to create the ciphertext using at least one key and a counter value. The ciphertext may include the counter value. The ciphertext may be obtained via one or more reads, including but not limited to one or more near field communication data exchange format (NDEF) reads by the device. The application of the device may be configured to perform the one or more reads of a tag, such as a near field communication (NFC) tag, of the card. For example, the card may be configured to transmit, after one or more entries into a communication field of a device, the ciphertext. Without limitation, each entry may be associated with a tap, a swipe, a wave, and/or any combination thereof.

At block 620, the method 600 may include encrypting the ciphertext. For example, the processor of the card may be configured to encrypt the ciphertext using one or more cryptographic algorithms.

At block 630, the method 600 may include transmitting the ciphertext for authentication so as to trigger generation of a key pair for signing a challenge. For example, the processor of the card may be configured to transmit the ciphertext via a communication interface to an application of a device, which may serve as an intermediary device between a server and the card to transmit any data including the ciphertext. In some examples, the ciphertext may be decrypted, via one or more cryptographic algorithms, by the application of the device for authentication. Based on the successful decryption of the ciphertext, the application of the device may be configured to transmit a response, including the ciphertext generated by the processor of the card in either encrypted or decrypted form, to the server. Upon verification of the response, including the encrypted or decrypted ciphertext by the server, a key pair may be generated by the server, in which one of the private keys is used to encrypt a challenge and one of the public keys is transmitted to decrypt the challenge. Upon successful decryption of the challenge using the public key, an authentication request, such as a website registration or launch of an application, may be successfully processed.

At block 640, the method 600 may include updating the counter value. For example, the processor of the card may be configured to update the counter value after transmission of the ciphertext. In other examples, the processor of the card may be configured to update the counter value after transmission and successful decryption of the ciphertext, either by the application comprising instructions for execution on the device or by the server. In other examples, processor of the card may be configured to update the counter value after successful decryption of the challenge that enables successful launch of an application of website registration. In this manner, method 600 may implement with distributed storage, cloud-based storage, and other forms of storage in support of the aforementioned functionalities.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

In the preceding specification, various embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

We claim:

1. An authentication system, comprising:
a contactless card comprising a processor, a contactless interface, and a memory storing at least one key, a counter value and a unique identifier;
a client device associated with an application and a browser extension; and
a cloud-based authenticator server comprising a processor and a memory,
wherein the client device:
intercept, by the browser extension, a Fast Identity Online (FIDO) authentication request prompted by a website;
redirects, via the browser extension, the FIDO authentication request, to the cloud-based authenticator server;
retrieves, by the application, a ciphertext, from the contactless card, in response to a notification for user identity verification received, by the application from the processor of the cloud-based authenticator server
transmits, by the application, the cipher to the cloud-based authenticator server;
wherein the processor of the cloud-based authenticator server:
receives a FIDO authentication request, redirected by the browser extension associated with the client device,
receives a response comprising the ciphertext from the application executing on the client device,
decrypt the ciphertext included in the response,
authenticates the response including the ciphertext,
encrypts, upon successful authentication of the response, a FIDO challenge associated with the FIDO authentication request, using a FIDO private key stored on the cloud-based authenticator server, to generate a signed FIDO challenge, and
transmits a FIDO public key associated with the FIDO private key to the website, wherein the website decrypts the signed FIDO challenge using the public key to verify the signed FIDO challenge; and
wherein the processor of the contactless card:
generates the ciphertext using the at least one key, and the counter value, stored in the memory of the contactless card, and
transmits, in response to one or more near field communication data exchange (NDEF) reads, the ciphertext to the application executing on the client device.

2. The authentication system of claim 1, wherein the client device is associated with a user of the contactless card.

3. The authentication system of claim 2, wherein the response received by cloud-based authenticator server from the application executing on the client device comprises one or more input data provided by the user.

4. The authentication system of claim 1, wherein the processor of the cloud-based authenticator server stores the FIDO private key in a secure element.

5. The authentication system of claim 1, wherein the FIDO public key, transmitted by the cloud-based authenticator server, is received by the browser extension associated with the client device and used by the browser extension to decrypt and validate the signed FIDO challenge.

6. The authentication system of claim 1, wherein the cloud-based authenticator server comprises a cloud-based authenticator.

7. The authentication system of claim 3, wherein the one or more input data comprises at least one selected from the group of biometric data and login data.

8. The authentication system of claim 1, wherein the FIDO private key and the FIDO public key are generated by the cloud-based authenticator server in response to the FIDO authentication request redirected, by the browser extension, from the client device.

9. The authentication system of claim 8, wherein the FIDO authentication request corresponds to a FIDO website registration request.

10. The authentication system of claim 5, wherein the browser extension transmits the FIDO public key received, by the browser extension associated with the client device, from the cloud-based authenticator server, to the website.

11. The authentication system of claim 9, wherein the FIDO public key is transmitted, by the cloud-based authenticator server, to a website associated with the FIDO website registration request.

12. A method of authentication, the method comprising the steps of:

intercepting by a client device a Fast identity Online (FIDO) authentication request prompted by a website;

redirecting, via a browser extension associated with the client device, the FIDO authentication request, to a cloud-based authenticator server;

receiving, by an application executing on the client device, a notification for user identity verification, from the cloud-based authenticator server;

retrieving, by the application executing on the client device, a ciphertext, from a contactless card, in response to the notification for user identity verification, wherein the ciphertext is generated by the contactless card, using at least one key and a counter value stored on a memory of the contactless card;

transmitting, by the application, a response including the ciphertext to the cloud-based authenticator server;

decrypting by the cloud-based authenticator the ciphertext included in the response;

authenticating, by the cloud-based authenticator server, the ciphertext included in the response;

encrypting, by the cloud-based authenticator server, upon successful authentication of the ciphertext, a FIDO challenge, associated with the FIDO authentication request, using a FIDO private key stored on the cloud-based authenticator authentication server, thereby generating a signed FIDO challenge;

transmitting a FIDO public key associated with the FIDO private key, to the website; and decrypting, by the website, the signed FIDO challenge using the FIDO public key and verifying the signed challenge.

13. The method of claim 12, wherein the client device and the contactless card are associated with a same user.

14. The method of claim 12, further comprising transmitting, by the cloud-based authenticator server, a third request.

15. The method of claim 14, further comprising receiving, by the cloud-based authenticator server, a second response that is responsive to the third request, the second response comprising input data.

16. The method of claim 15, wherein the input data comprises at least one selected from a group of biometric data and login data.

17. The method of claim 12, wherein the FIDO private key is stored in a secure element hosted in the cloud, the secure element being associated with the cloud-based authentication authenticator server.

18. The method of claim 12, wherein the counter value is incremented, by the contactless card, following the generation of the ciphertext.

19. The method of claim 12, wherein the application, executing on the client device, receives the ciphertext when a near field communication (NFC) tag of the contactless card is read by the client device.

20. The method of claim 12, wherein the client device corresponds to a communication device associated with a user of the contactless card.

\* \* \* \* \*